(12) United States Patent
Chin

(10) Patent No.: US 9,024,890 B2
(45) Date of Patent: May 5, 2015

(54) COMPARISON OF AN APPLIED GESTURE ON A TOUCH SCREEN OF A MOBILE DEVICE WITH A REMOTELY STORED SECURITY GESTURE

(76) Inventor: David H. Chin, Menlo Park, CA (US)

( * ) Notice: Subject to any disclaimer, the term of this patent is extended or adjusted under 35 U.S.C. 154(b) by 401 days.

(21) Appl. No.: 13/083,632

(22) Filed: Apr. 11, 2011

(65) Prior Publication Data

US 2011/0187497 A1 Aug. 4, 2011

Related U.S. Application Data

(63) Continuation-in-part of application No. 12/122,667, filed on May 17, 2008, now Pat. No. 8,174,503.

(51) Int. Cl.
*G06F 3/041* (2006.01)
*G06F 21/00* (2013.01)
*H04L 9/32* (2006.01)

(52) U.S. Cl.
CPC . *G06F 21/00* (2013.01); *H04L 9/32* (2013.01)

(58) Field of Classification Search
CPC .............. G06F 21/32; G06F 21/00; G06F 2203/04808; G06F 3/017; G06F 3/04883; G06F 3/011; G06Q 20/10; G06Q 20/102; G06Q 40/00; H04L 9/32; H04M 1/72519; H04M 2250/52
USPC ............ 345/156–184, 204; 178/18.01–18.09, 178/19.01–19.04, 20.01
See application file for complete search history.

(56) References Cited

U.S. PATENT DOCUMENTS

| | | | |
|---|---|---|---|
| 5,878,211 A | * | 3/1999 | Delagrange et al. ............ 726/34 |
| 6,335,726 B1 | | 1/2002 | Ilan et al. |
| 6,668,081 B1 | | 12/2003 | Ilan et al. |
| 7,004,394 B2 | | 2/2006 | Kim |
| 7,657,849 B2 | | 2/2010 | Chaudhri et al. |
| 7,683,888 B1 | | 3/2010 | Kennedy |

(Continued)

FOREIGN PATENT DOCUMENTS

| | | |
|---|---|---|
| CN | 101911378 | 12/2010 |
| EP | 1964022 A1 | 9/2008 |

(Continued)

OTHER PUBLICATIONS

"Some of Apple's Future RFID Magic is revealed in a New Patent"; http://www.patentlyapple.com/patently-apple/2011/09/some-of-apples-future-rfid-magic-is-revealed-in-a-new-patent.html; Sep. 15, 2011.

(Continued)

*Primary Examiner* — Kumar Patel
*Assistant Examiner* — Insa Sadio
(74) *Attorney, Agent, or Firm* — David E. Crites

(57) ABSTRACT

A method of a mobile device comparing an applied gesture on a touch screen of a mobile device with a remotely stored security gesture is disclosed. In one embodiment, a method of a mobile device includes determining that an applied gesture on a touch screen of a mobile device in a locked state is associated with a user-defined gesture, comparing the applied gesture on the touch screen of the mobile device with a designated security gesture stored in a remote computer server, and unlocking the mobile device when the applied gesture on the touch screen of the mobile device in a dormant state matches the designated security gesture stored in the remote computer server.

23 Claims, 24 Drawing Sheets

(56) References Cited

U.S. PATENT DOCUMENTS

| | | | |
|---|---|---|---|
| 7,877,707 B2 | 1/2011 | Westerman et al. | |
| 7,928,965 B2 | 4/2011 | Rosenblatt et al. | |
| 8,046,721 B2 | 10/2011 | Chaudhri et al. | |
| 2005/0253817 A1* | 11/2005 | Rytivaara et al. | 345/173 |
| 2006/0026535 A1 | 2/2006 | Hotelling et al. | |
| 2007/0066323 A1* | 3/2007 | Park et al. | 455/456.2 |
| 2008/0055397 A1* | 3/2008 | Landschaft et al. | 348/14.01 |
| 2008/0165255 A1* | 7/2008 | Christie et al. | 348/207.99 |
| 2008/0278455 A1 | 11/2008 | Atkins et al. | |
| 2008/0316183 A1 | 12/2008 | Westerman et al. | |
| 2009/0083850 A1 | 3/2009 | Fadell et al. | |
| 2009/0085877 A1 | 4/2009 | Chang et al. | |
| 2009/0175499 A1 | 7/2009 | Rosenblatt | |
| 2009/0176517 A1 | 7/2009 | Christie et al. | |
| 2009/0177750 A1 | 7/2009 | Lee et al. | |
| 2010/0078471 A1 | 4/2010 | Lin et al. | |
| 2010/0078472 A1 | 4/2010 | Lin et al. | |
| 2010/0082471 A1 | 4/2010 | Hylton | |
| 2010/0082481 A1 | 4/2010 | Lin et al. | |
| 2010/0082490 A1 | 4/2010 | Rosenblatt et al. | |
| 2010/0174599 A1 | 7/2010 | Rosenblatt et al. | |
| 2010/0178956 A1* | 7/2010 | Safadi | 455/563 |
| 2011/0261213 A1 | 10/2011 | Rottler et al. | |
| 2011/0283241 A1 | 11/2011 | Miller et al. | |
| 2011/0296356 A1 | 12/2011 | Chaudhri et al. | |
| 2012/0023458 A1 | 1/2012 | Chaudhri et al. | |
| 2012/0036556 A1 | 2/2012 | LeBeau et al. | |

FOREIGN PATENT DOCUMENTS

| | | |
|---|---|---|
| EP | 2232627 A2 | 9/2010 |
| WO | 2009085777 | 7/2009 |

OTHER PUBLICATIONS

"Inside Apple's iOS 5: LED flash on calls, custom accessibility gestures & vibrations"; http://www.appleinsider.com/articles/11/06/09/inside_apples_ios_5_led_flash_on_calls_custom_accessibility_gesturesvibrations.html; Jun. 9, 2011; 8 Pages.

"NFC payment in Android (Gingerbread)" by Alexander Viken; ; Nov. 17, 2010; 7 Pages.

"Google Patent Reveals Future Unlock Features for Android Devices" by Jack Purcher; http://www.patentlyapple.com/patently-apple/2012/02/google-patent-reveals-future-unlock-features-for-android-devices.html; Feb. 16, 2012; 8 Pages.

* cited by examiner

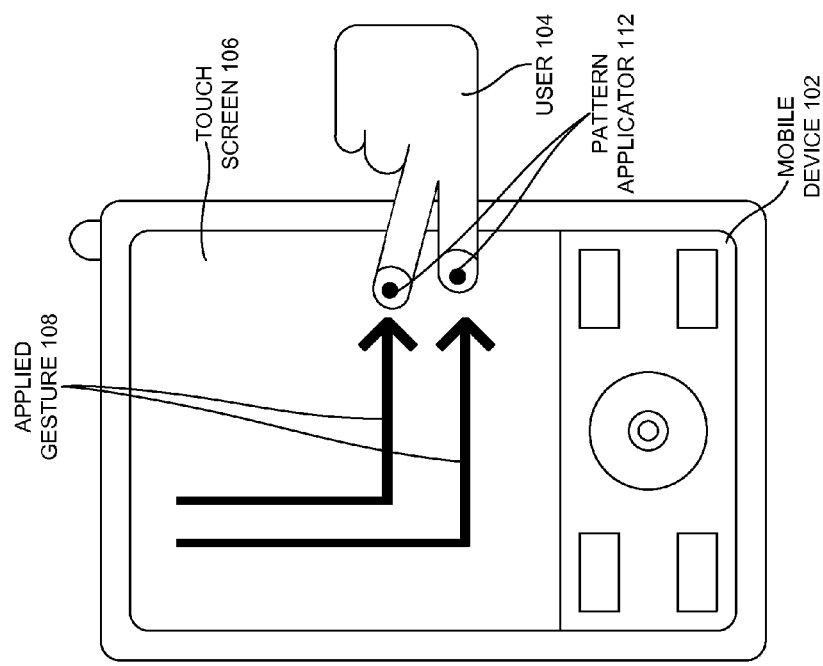

| INITIAL STATE 302 | INPUT GESTURE 304 | ANOTHER INPUT GESTURE MATCHES STORED GESTURE? 306 | ACCESS 308 | ACTION 310 |
|---|---|---|---|---|
| LOCKED | APPLIED GESTURE | YES | GRANTED | DEVICE UNLOCKED |
| LOCKED | APPLIED GESTURE | NO | DENIED | DEVICE REMAINS UNLOCKED |
| OPERATING | APPLIED GESTURE | YES | GRANTED | ACCESS TO REMOTE COMPUTER RESOURCE ALLOWED |
| OPERATING | APPLIED GESTURE | NO | DENIED | ACCESS TO REMOTE COMPUTER RESOURCE DENIED |
| ... | ... | ... | ... | ... |

FIGURE 3

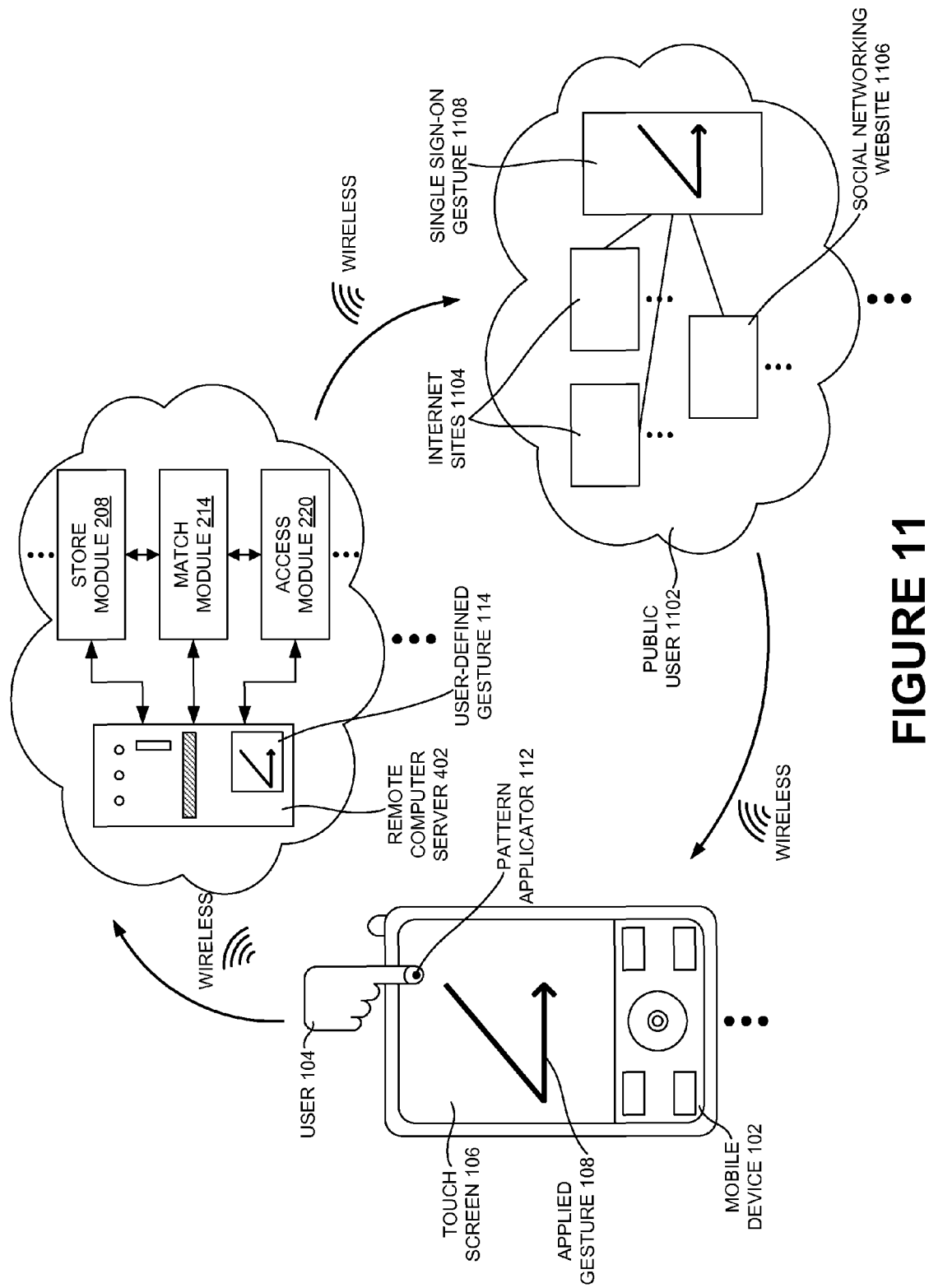

COMPARISON OF AN APPLIED GESTURE ON A TOUCH SCREEN OF A MOBILE DEVICE WITH A REMOTELY STORED SECURITY GESTURE

CLAIM OF PRIORITY

This is a continuation in part and claims priority to U.S. patent application Ser. No. 12/122,667 titled 'Touch-Based Authentication of a Mobile Device through User Generated Pattern Creation' filed on May 17, 2008.

FIELD OF TECHNOLOGY

This disclosure relates generally to a mobile device, in one example embodiment, to comparison of an applied gesture on a touch screen of a mobile device with a remotely stored security gesture.

BACKGROUND

Security of a mobile device, security information and private information of a user stored locally within or accessible by a mobile device (e.g., a mobile phone, a mobile media player, a tablet computer, an Apple® iPhone®, an Apple® iPad®, a Google® Nexus S®, a HTC® Droid® etc.) may be of concern to a user of a mobile device. Furthermore, the user may utilize the mobile device in manner similar to a personal computer (e.g., browse the Internet, access email, access personal financial information, post on a social-media website etc.). Consequently, the mobile device may include confidential information and user security information (e.g., a web browser history, a usernames and a password, an email account, a past call history, a text message, a user-name, a password, a voice message, etc.). Due to the nature of this type of information, a security breach may be costly to the user or his/her organization (e.g., a difficulty in recreating lost information, a lost subject matter, a loss of a trade secret, a breach of personal and/or corporate privacy, etc.).

A design of the mobile device may make it problematic to implement an additional security protocol. For example, the mobile device may utilize a touch screen (e.g., a display which can detect a location of patterns in a display area) for user input rather than a physical keypad. The user may be able to access the mobile device utilizing the touch screen simply by tapping a surface of the touch screen in an arbitrary manner and/or performing a templated gesture (e.g., a pattern such as movement from left to right) on a surface of the touch screen. As a result, confidential information may be accessed by anyone merely in physical possession of the mobile device.

The touch screen mobile device may include a virtual keypad (e.g., a form of a template to guide the user, an alpha-numeric virtual key pad, etc.). The user may use the virtual keypad to enter a pass code to access information. This process may be slow and/or cumbersome (e.g., a fingertip of the user may be of comparatively same size as an area of a virtual keypad symbol, the virtual keypad may not have the same tactile feel as the physical keypad, etc.). Use of a virtual keypad may also be inconvenient and/or dangerous when an attention of the user is diverted (e.g., walking, working, eating, etc.). A handicapped user (e.g., a sight-impaired person, a person without fingers or hands, a person with impaired dexterity, etc.) may have difficulty inputting information with the virtual keypad. Furthermore, the alpha-numeric pass code may be difficult to remember for a primary user and/or secondary users of the mobile device. Thus, security of the mobile device may be breached resulting in theft and/or misappropriation of the confidential information that may be stored in the mobile device. Furthermore, it may be cumbersome to sequentially enter a series of different alphanumeric user names and passwords in order to expediently gain access to multiple related restricted remote resources (such as a collection of social networking websites).

The use of gesturing technology for a mobile device may provide a mechanism by which a user of the mobile device may be able to grant or prevent access to the mobile device. Typically, a tactile security gesture that may grant or prevent access to a mobile device is stored locally within the mobile device (e.g., on a hard disk and/or on a memory chip within the mobile device). This may provide a minimal level of protection for a user of a mobile device.

However, a loss, theft, or destruction of a mobile device may necessarily mean a total loss of access to the information and data stored locally within the mobile device in addition to the tactile security gesture and other "log-in" information consisting of private user-identifying data such as user-names and passwords, also stored locally in the mobile device. In addition, a technology based on a locally-stored security gesture that may only grant or deny access to a single mobile device for a single user may make it very cumbersome for a user of a mobile device to access information and data stored on other mobile devices or on other data resources requiring user authentication (e.g., an Internet site in a public web, a password protected website, a social networking website, etc.).

SUMMARY

A method of comparing an applied gesture on a touch screen of a mobile device with a remotely stored security gesture is disclosed. In one aspect, a method of a mobile device includes determining that an applied gesture on a touch screen of a mobile device is associated with a user-defined gesture which may be stored in a remote computer server. The method may include comparing the applied gesture on the touch screen of the mobile device with a designated security gesture which may be stored in a remote computer server and then unlocking the mobile device when the applied gesture on the touch screen of the mobile device in a dormant state matches the designated security gesture stored in the remote computer server.

The method may include recognizing a user-defined gesture on a touch screen, storing the user-defined gesture to a memory (e.g., may be a local memory of the mobile device that may be internal to the mobile device) of the mobile device, or on a remote computer server (external to the mobile device) and associating an applied gesture on the touch screen with the user-defined gesture, and transforming the mobile device from an initial state to an unlocked state based on the association between the applied gesture and the user-defined gesture.

The method may include transforming the mobile device to operate as a telephonic communication device in the unlocked state. The method may also include accessing a contact list and/or a greeting message based on a user profile of the telephonic communication device associated with the unlocking gesture to transform the mobile device to operate as the telephonic communication device. In addition, the method may include accessing a media playlist based on the user profile of the telephonic communication device associated with the user-defined gesture to transform the mobile device to operate as a media player.

The method may include accessing a set of bookmarks based on the user profile of the telephonic communication device associated with the user-defined gesture to enable customized settings on a browser application of the mobile device. The method may also include determining that the applied gesture may be performed on multiple distinct locations on the touch screen while recognizing the applied gesture as the user-defined gesture. The multiple distinct locations may be simultaneously and/or serially placed.

The method may include designating a region of the mobile device as available to receive an applied gesture, such that the applied gesture may be algorithmically determinable to be the user-defined gesture when recognized in the designated region. The method may also include determining the duration of an applied gesture at a particular location of the touch screen to determine whether it may be the user-defined gesture. In addition, the method may include determining that a total time to create the applied gesture may be within a permitted amount of time when determining whether it is the user-defined gesture.

In another aspect, the method may include a remote computer server based access of a mobile device. The method may provide for accepting a user-defined gesture as an input gesture on a mobile device and transmitting and storing of the user-defined gesture in the remote computer server. The method may also include comparing an applied gesture on the mobile device to the user-defined gesture stored in the remote computer server. Finally, the method may allow the unlocked mobile device to operate locally as a mobile device.

The method may include operating the mobile device in the initial state such that certain functions may be disabled in the initial state to conserve battery consumption of the mobile device through a power management circuitry of the mobile device. The method may also include determining that an applied gesture is unrelated with the user-defined gesture. In addition, the method may transform the mobile device from the initial state to a locked state based on the determination that the applied gesture may be unrelated with the user-defined gesture.

The method may include permitting the mobile device to communicate with an emergency service provider even when in the locked state. The method may also include determining that the applied gesture may be similar to a locally or remotely stored gesture beyond a tolerance value. The method may request a different gesture to be stored when the determination may be made that the user-defined gesture may be similar beyond the tolerance value. In addition, the method may include determining that the applied gesture may be unique but within an acceptance range of associability with the user-defined gesture when associating the applied gesture with the user-defined gesture.

The method may include accessing a remote resource stored on a remote computer server on a mobile device. The method may also include storing a user-defined gesture in a remote computer server and accepting an applied gesture as an input on the mobile device and transmitting the applied gesture to the remote computer server. The method may further include comparing the applied gesture applied on the mobile device to the user-defined gesture stored in the remote compute server and sending an authorizing signal to the mobile device to permit access to a resource stored in the remote computer server.

In another aspect, a method of a mobile device includes determining whether an applied gesture on a touch screen is associated with a designated security gesture (e.g., may be a user-defined gesture that may be stored in a memory that is internal to the mobile device, or a user-defined gesture that may be stored in a remote computer server), permitting access to a set of applications of the mobile device when an association is made between the applied gesture and the designated security gesture, and denying access to the set of applications of the mobile device when the association fails to be made between the applied gesture and the designated security gesture.

The method may also include directly opening a particular application of the mobile device when the association may be made between the applied gesture and the designated security gesture.

In yet another aspect, a mobile device includes a touch screen to recognize an applied gesture using a processor of the mobile device, a security module interfaced with the processor to associate the applied gesture with a designated security gesture, and to determine access to a set of features on the mobile device based on the association, and a user module of the security module to create security gestures based on a user input.

The method may include directly storing a user-defined gesture locally within a mobile device (e.g., on a memory card inside the mobile device). The method may also include accepting an applied gesture as an input of the mobile device and determining whether the applied gesture is associated with the user-defined gesture. The method may permit access to a set of applications in a remote computer server when an association is made between the user-defined gesture, stored locally on the mobile device, and the applied gesture and may deny access to a set of applications in the remote computer server when an association fails to be made between the user-defined gesture, stored locally on the mobile device, and the applied gesture.

In yet another aspect, a mobile device includes a method to securely access multiple resources in a remote computer server by applying a gesture. The method may allow for storing a user-defined gesture in a remote computer server and designating the user-defined gesture as a single sign-on gesture. The single sign-on gesture may provide access to multiple otherwise restricted Internet sites as well as to resources hosted in a remote computer server. The method may also involve accepting an applied gesture as an input on a mobile device and transmitting the applied gesture to the remote computer server where it may be determined whether the applied gesture is associated with the user-defined gesture stored in the remote computer server. The method may permit access with the single sign-on gesture to multiple Internet sites in the public web that require a username and a password for authentication via the remote computer server and on the mobile device when an association is made between the user-defined gesture and the applied gesture and may deny access to multiple Internet sites in the public web that require a username and a password for authentication via the remote computer server and on the mobile device when an association fails to be made between the user-defined gesture and the applied gesture.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIGS. 1A, 1B, 1C, 1D, 1E and 1F illustrate a system view of a mobile device recognizing an application of a gesture in a designated region through a tactile pattern on a touch screen or on a non-display touch-receptive input area, according to one embodiment.

FIG. 3 is a table view illustrating various fields such as an initial state, an input gesture, another input gesture, access, action, etc., according to one embodiment.

FIG. 11 is a block diagram of a mobile device that gains access to a group of Internet sites through a remote computer server which stores, matches and allows access based on an association between an applied gesture and a user-defined gesture stored in the remote computer server, according to one embodiment.

Other features of the present embodiments will be apparent from the accompanying drawings and from the detailed description that follows.

DETAILED DESCRIPTION

A method of comparing an applied gesture on a touch screen of a mobile device with a remotely stored security gesture is disclosed. The applied gesture may also be applied on a non-display touch-receptive input area of a mobile device. In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments of the present invention.

Figure 1A:
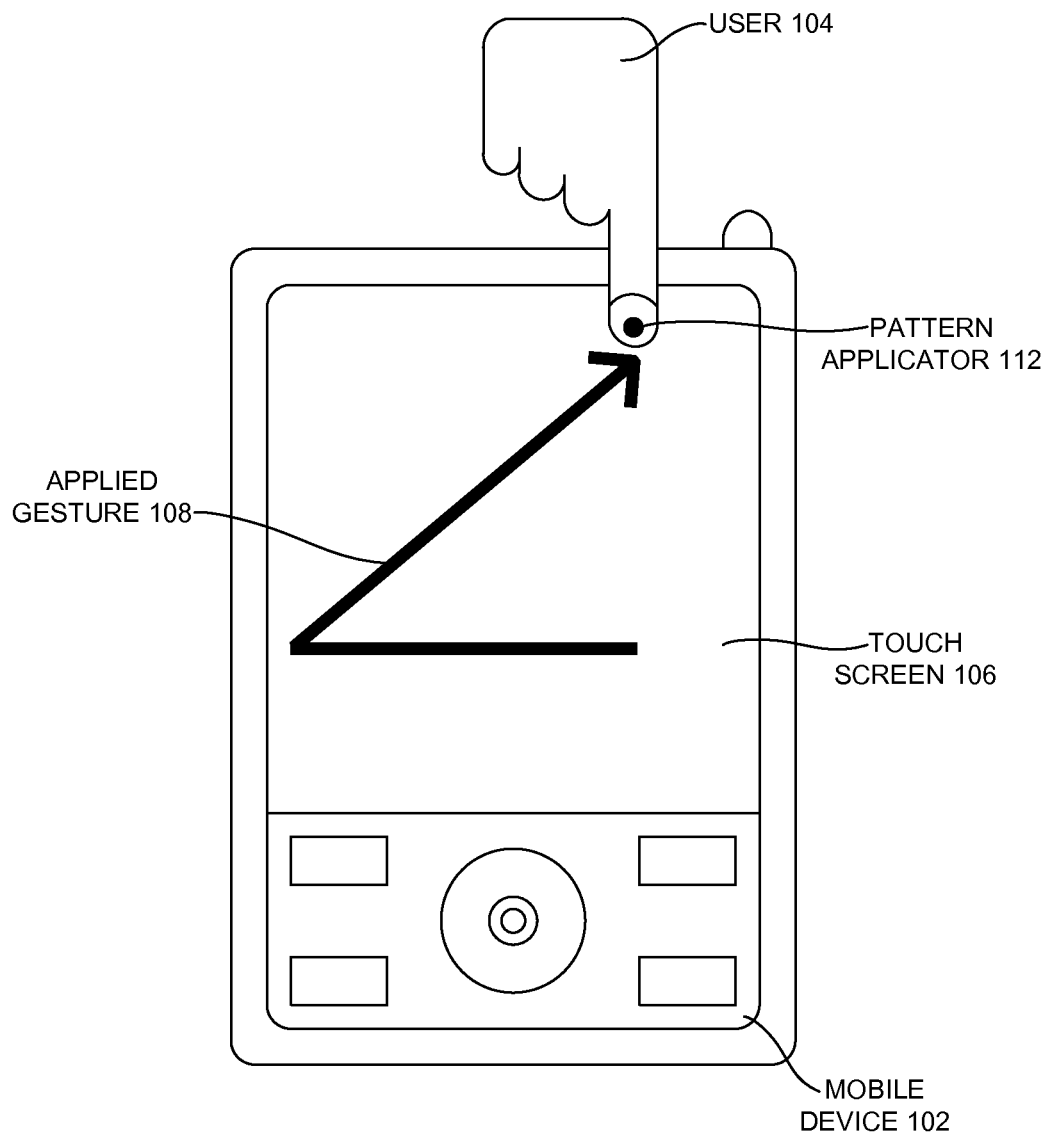
Figure 1B:
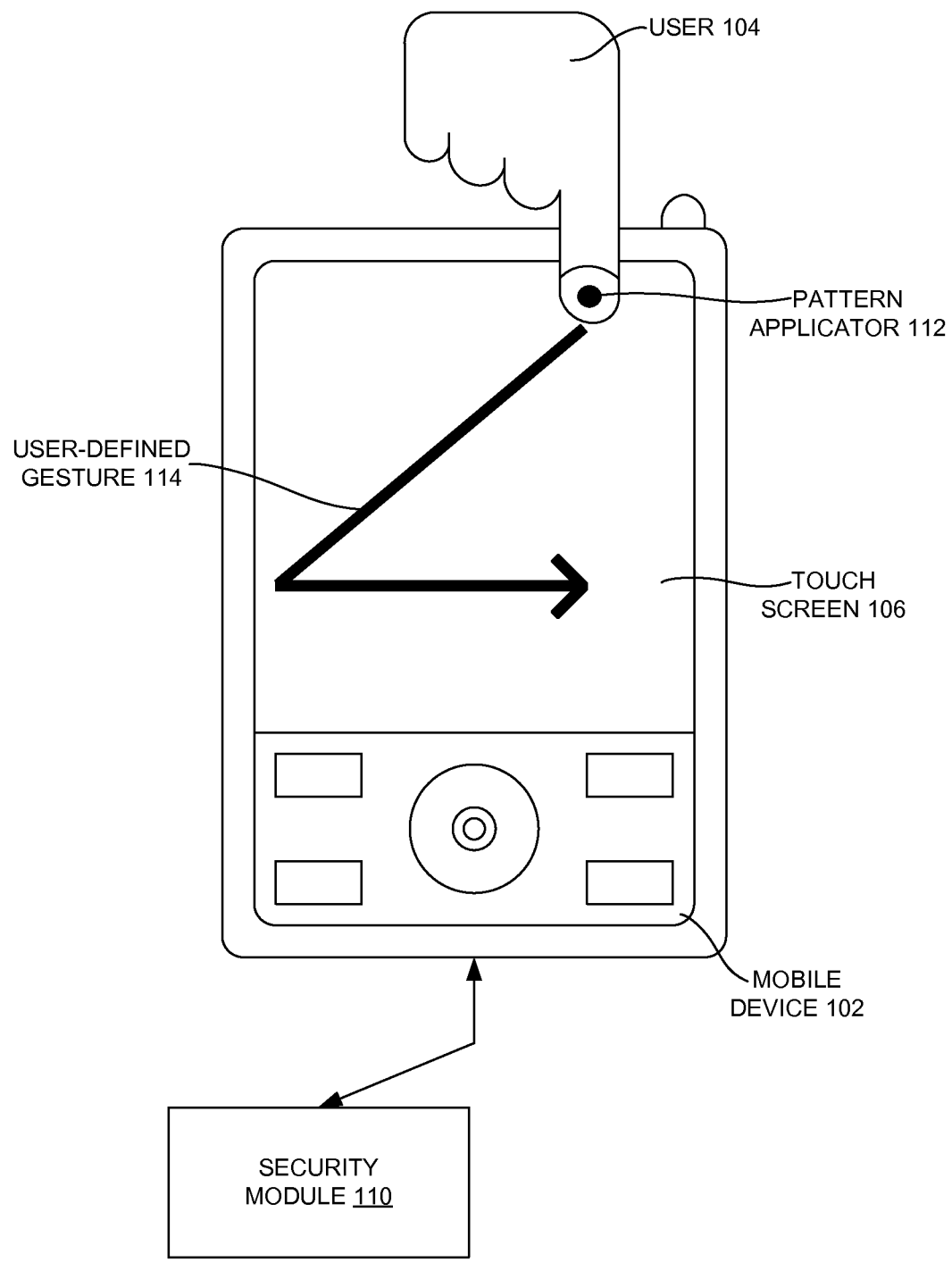
Figure 1C:
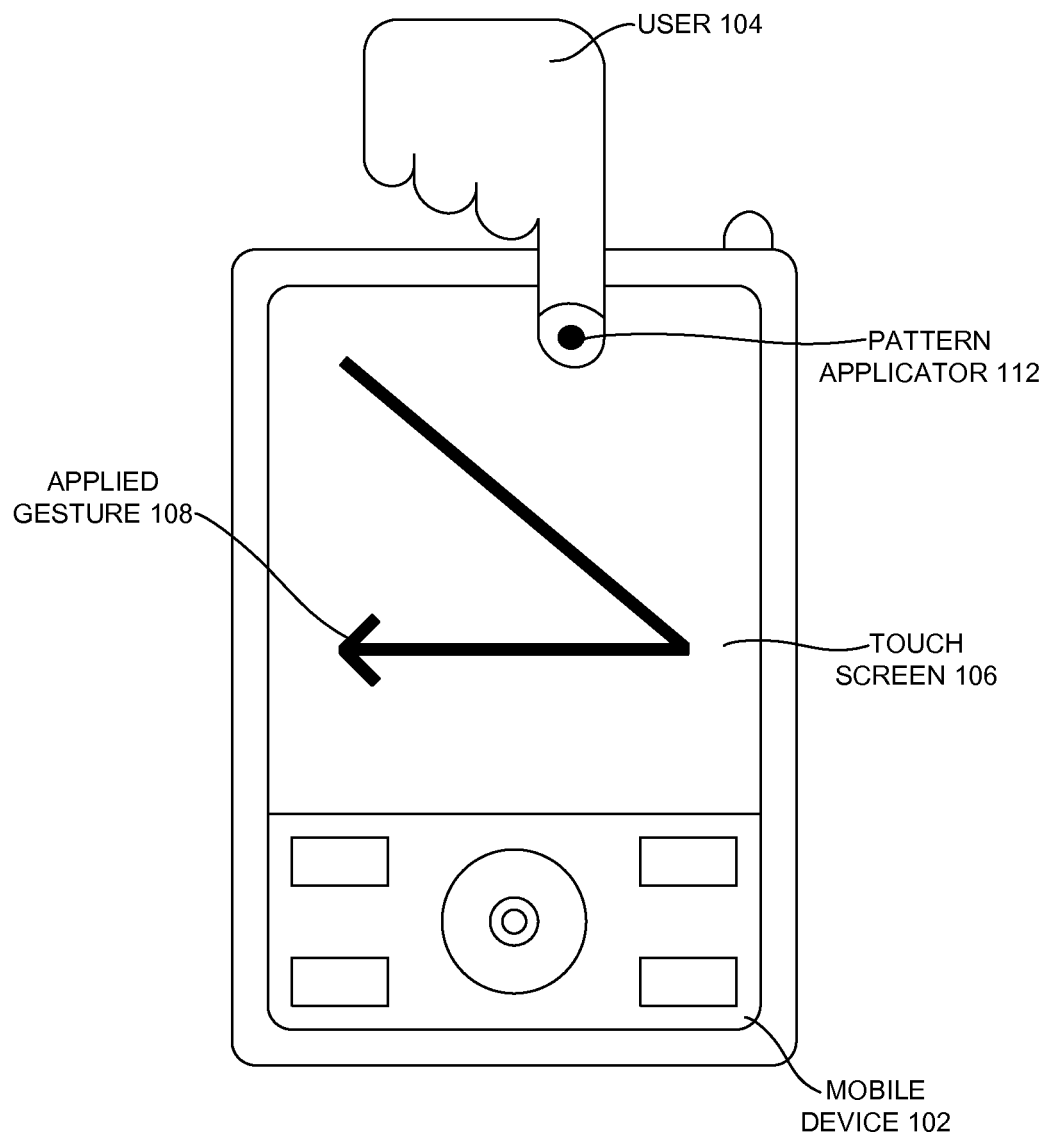

In one embodiment, a method of a mobile device 102 shown in FIGS. 1A, 1B, 1C, 1D, and 1E includes determining an applied gesture 108 on a touch screen 106 as an unlocking gesture is associated with a user-defined gesture 114 as shown in FIG. 1B, comparing the applied gesture 108 on the touch screen 106 with a designated security gesture stored in a remote computer server 402 as shown in FIGS. 4A, 4B, 4C and 4D, and unlocking the mobile device 102 when the applied gesture 108 on the touch screen 106 of the mobile device 102 matches the designated security gesture stored in the remote computer server 402. The embodiment may also involve associating the applied gesture 108 on the touch screen 106 with the user-defined gesture 114, and transforming the mobile device 102 from an initial state to an unlocked state based on the association between the applied gesture 108 and user-defined gesture 114. According to one embodiment, an applied gesture 108 may be a tactile gesture performed on a touch receptive area of the mobile device 102. The applied gesture 108 may be performed on a touch-receptive input area 120 of a mobile device 102, which is not the touch screen 106 of the mobile device 102. According to another embodiment, an unlock gesture may be a user-defined gesture 114 or a single sign-on gesture 1108 both of which may be stored in a remote computer 402 and recognized as the designated security gesture.

In another embodiment, a method of a mobile device 102 illustrated in FIGS. 1A, 1B, 1C, 1D and 1E includes determining whether an applied gesture 108 on a touch screen 106 is associated with a user-defined gesture (e.g., may be a gesture that may be stored in a memory that is internal to the mobile device or on a remote computer server 402), permitting access to a set of applications of the mobile device 102 when an association is made between the applied gesture 108 and the designated security gesture, and denying access to the set of applications of the mobile device 102 when the association fails to be made between the applied gesture 108 and the designated security gesture.

In another embodiment, multiple resources in a remote computer server 402 may be accessed through a mobile device 102 by accepting a user-defined gesture 114 as an input on a mobile device 102, transmitting the user-defined gesture 114 to a remote compute server 402, storing the user-defined gesture 114 in the remote computer server 402, comparing an applied gesture 108 on the mobile device 102 to the user-defined gesture 114 stored in the remote computer server 402, sending an authorizing signal to permit access to the mobile device 102 if the applied gesture 108 performed on the mobile device 102 matches the user-defined gesture 114 and allowing the unlocked mobile device to operate locally as a mobile device or allowing the mobile device 102 to access data and information resident on the remote compute server 402.

In yet another embodiment, a mobile device 102 includes a touchscreen 106 to recognize an applied gesture using a processor (e.g., the processor 1402 of FIG. 14) of the mobile device 102, a security module (e.g., the security module 110 of FIG. 1B) interfaced with the processor 1402 to associate the applied gesture 108 with a designated security gesture, and to determine access to a set of features on the mobile device 102 based on the association, and a user module (e.g., the user module 210 of FIG. 2) of the security module 110 to create security gestures based on a user input.

One exemplary embodiment may involve unlocking the mobile device 102 when the applied gesture 108 on the touchscreen 106 of the mobile device 102 matches the designated security gesture (e.g., the user-defined gesture 114) stored in the remote computer server 402, and when the applied gesture 108 is determined to be the user-defined gesture 114. Another embodiment may involve remotely enabling the user to define the user-defined gesture 114 and remotely enabling the user to access the mobile device 102 if the user-defined gesture 114 is unsuccessful. An exemplary embodiment may also involve enabling remote disablement of one or more mobile devices associated with the user-defined gesture 114 or permitting a user-defined gesture 114 when there is no network connectivity that allows access to an application and data resident on the mobile device 102 without permitting access to an another application and other data resident on the mobile device 102.

FIGS. 1A, 1B, 1C, 1D and 1E illustrate a system view of a mobile device recognizing an application of an applied gesture in a designated region through a pattern applicator 112 on a touchscreen 106, according to one embodiment. The applied gesture 108 may be independent of a scale value and a position value on the touch screen 106 or may be dependent of a scale value and a position value on the touch screen 106. The applied gesture 108 may or may not depend on sequential activation of fixed areas on the touch screen 106. The applied gesture 108 may be performed on any location within an input region (e.g. FIG. 1F) of the mobile device 102. Particularly, FIGS. 1A and 1B, taken together, illustrate a mobile device 102, a pattern applicator 112, an applied gesture 108, a user-defined gesture 112, a touch screen 106, and a security module 110, according to one embodiment.

The mobile device 102 may be a device used for communication and/or for processing information (e.g., browsing, forums, mail, chat, etc.) through the network (e.g., Internet). The applied gesture 108 may be a force applied physically by the user (e.g., by touching, by using a stylus, etc.). The touch screen 106 may be an input/output interface which may detect a location of touch within the display area. The security module 110 may provide security to the mobile device 102 based on the user-defined gesture 114 (e.g., the designated security gesture).

In one example embodiment, it may be determined that an applied gesture 108 on a touch screen 106 in a locked state (i.e., mobile device inoperable without being unlocked) is associated with a user-defined gesture 114. In another embodiment, a comparison may take place between the applied gesture 108 and a designated security gesture (e.g., the unlock gesture) stored in a remote computer server 402. The embodiment may involve unlocking the mobile device when the applied gesture 108 on the touch screen 106 of the mobile device 102 in a dormant state (i.e., such as a locked state) matches the designated security gesture stored in the remote computer server 402.

According to one embodiment, a method of remote computer server based access of a mobile device may be employed. A user-defined gesture 114 may be accepted as an input (e.g., such as an applied gesture 108) on a mobile device 102. The user-defined gesture 114 may be transmitted to and stored in a remote computer server 402. In an exemplary embodiment, a comparison may be made between the applied gesture 108 and the user-defined gesture 114 stored in the remote computer server 402. An authorization signal may be sent from the remote computer 402 to the mobile device 102 to permit access to the mobile device 102 if the applied gesture 108 matches the user-defined gesture 114. If not, the mobile device 102 would remain in a locked state. In an embodiment, if the applied gesture 108 matches the user-defined gesture 114, the mobile device 102 may be operated locally as a mobile device (e.g., as a phone to make calls) or the mobile device 102 may be permitted to access a data resource (e.g., an application, a file, an email account etc.) stored in the remote computer 402.

In example embodiment, the mobile device 102 may recognize an applied gesture 108 applied through the pattern applicator 112 (e.g., may be in the form of touch, etc.) on the touch screen 106. The pattern may be an applied gesture 108 that may be used for unlocking the mobile device 102 or for allowing the mobile device 102 to access data and information resident on a remote computer server 402.

Figure 2:
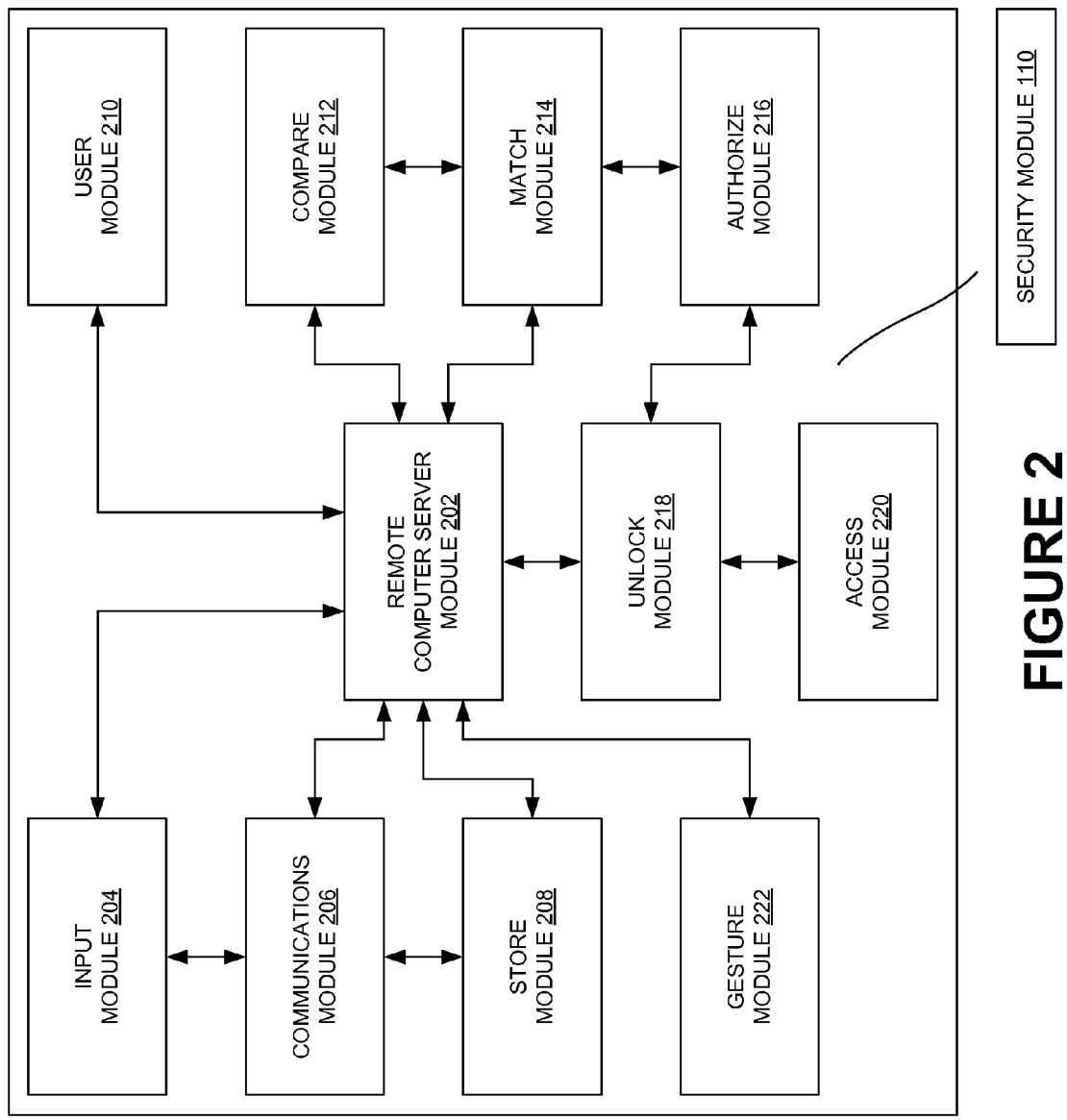
FIG. 2 is a block illustration of the contents of a security module and processes that may occur within, according to one embodiment.

FIG. 2 is a block illustration of the contents of a security module 110 and processes that may occur within, according to one embodiment. Particularly, FIG. 2 illustrates an input module 204, a communications module 206, a store module 208, a gesture module 222, a remote computer server module 202, an unlock module 218, an access module 220, a user module 210, a compare module 212, a match module 214 and an authorize module 216, according to one exemplary embodiment.

The input module 204 may accept an applied gesture 108, which may be a tactile gesture performed on the mobile device 102. The communications module 206 may communicate the applied gesture 108 to the store module 208, wherein the applied gesture 108 may be stored. The gesture module 222 may recognize the applied gesture 108 as a gesture to be compared with a user-defined gesture 114. The user module 210 may identify a user of the mobile device 102 and may recognize an input gesture by the user of the mobile device 102 as an applied gesture 108. The compare module 212 may compare the applied gesture 108 and the user-defined gesture 114 stored in the remote computer server 402. The match module 214 may match the applied gesture 108 to the user-defined gesture 114 stored in the remote computer server 402. The authorize module 216 may grant authorization for the mobile device 102 to access data resources stored in the remote computer server 402 upon matching of the applied gesture 108 and the user-defined gesture 114. The unlock module 218 unlocks the mobile device 102 upon receiving an authorization from the remote computer server 402 and the access module 220 permits access to data resources stored in the remote computer server 402. The input module 204, the communications module 206, the store module 208, the gesture module 222, the user module 210, the compare module 212, the match module 214, the authorize module 216, the unlock module 218 and the access module 220 may interact with the remote computer server module 402.

According to one embodiment, the gesture module 222 may enable the mobile device 102 to recognize the application of an applied gesture (e.g., applied gesture 108) as the unlocking gesture. The user module 210 may detect an applied gesture as an unlocking gesture on the touch screen 106. The match module 214 may match another applied gesture (e.g., an applied gesture 108) on the touchscreen 106 along with the unlocking gesture (e.g., a user-defined gesture 114.). The store module 208 may enable storing the user-defined gesture 114 in a remote computer server 402. The authorize module 216 may authorize the mobile device 102 to function as a telephonic communication device when unlocked by means of a recognized and validated unlocked gesture. The unlock module 218 may unlock the mobile device 102 after recognizing and validating the unlocking gesture.

In an example embodiment, the compare module 212 may communicate with the match module 214 which in turn may communicate with the authorize module 216 to permit the mobile device 102 to access data resources in the remote computer server 402 after the applied gesture 108 is determined to match the user-defined gesture 114. The remote computer server module 202 may communicate with the store module 208, the user module 210, the compare module 212, the match module 214, the authorize module 216, the unlock module 218, and the gesture module 222. The unlock module 218 may communicate with the access module 220 for changing the state (e.g., locked to unlocked, unlocked to locked, etc.) of the mobile device 102.

In one embodiment, the touch screen 106 may recognize the applied gesture 108 using the gesture module 222. The security module 110 may be interfaced with the processor 1402 to associate the applied gesture 108 with a designated security gesture. The user module 210 may create security gestures based on a user input (e.g., using the user module 210 of FIG. 2). The mobile device 102 may be transformed to operate as a telephonic communication device in the unlocked state.

A data resource stored in the remote computer server 402 (e.g., using the remote computer server module 202 of FIG. 2) associated with the unlocking gesture may be accessed to transform the mobile device 102 (e.g., using the unlock module 218 of FIG. 2) to operate as the telephonic communication device. A media playlist stored on a remote computer server 402 based on the user profile (e.g., using the user module 210 of FIG. 2) associated with the user-defined gesture 114 (e.g., using the unlock module 218 of FIG. 2) may be generated to transform the mobile device 102 to operate as a media player. The touch screen 106 may be designated to receive the applied gesture 108, such that the applied gesture 108 may be algorithmically determinable to be the user-defined gesture 114 when recognized by the remote computer server module 202 as the designated security gesture.

The duration of the applied gesture 108 (e.g., using the gesture module 222 of FIG. 2) at a particular location of the touch screen 106 may be used to determine whether it may be the designated security gesture by being associable with the user-defined gesture 114. The total time to create the applied gesture 108 (e.g., using the compare module 212 of FIG. 2) may be within a permitted amount of time when determining whether it may be the unlocking gesture. The mobile device 102 in the initial state may be operated such that certain functions may be disabled in the initial state to conserve battery consumption of the mobile device 102 through a power management circuitry of the mobile device 102.

The memory associated with the mobile device 102 may be internal to the mobile device 102 or may be external to the mobile device 102 (e.g., using the remote computer server module 202 of FIG. 2). It may be determined that the applied gesture 108 may be unrelated with the user-defined gesture 114. The mobile device 102 may be transformed from the initial state to a locked state based on the determination that the applied gesture 108 may be unrelated with the user-defined gesture 114 (e.g., using the unlock module 218 of FIG. 2). The mobile device 102 may be permitted (e.g., using the access module 220 of FIG. 2) to communicate with an emergency service provider even when in the locked state.

It may be determined (e.g., using the compare module 212 of FIG. 2) that the unlocking gesture may be similar to a designated security gesture stored in the remote computer server 402 beyond a tolerance value. A different user-defined gesture 114 may be requested to be stored (e.g., using the store module 208 of FIG. 2) when the determination may be made that the unlocking gesture may be similar beyond the tolerance value. It may be determined (e.g., using the match module 214 of FIG. 2) that the applied gesture 108 may be unique but within an acceptance range of associability with the designated security gesture when associating the applied gesture 108 with the user-defined gesture 114. The designated security gesture may be the user-defined gesture 114 that may be stored (e.g., using the store module 208 of FIG. 2) in a memory that may be external to the mobile device 102 (e.g., in the remote computer server 402).

FIG. 3 is a table view illustrating various fields such as an initial state, an input gesture, another input gesture, access, action, etc., according to one embodiment. Particularly, FIG. 3 illustrates an initial state 302, an input gesture 304, whether another input gesture matches a stored gesture 306, an access 308 and an action 310.

According to an exemplary embodiment, if the initial state 302 is locked and the input gesture 304 is the applied gesture 108 and the applied gesture 108 matches the stored gesture 306, access 308 may be granted and the action 310 may result in the mobile device 102 being unlocked. In the same embodiment, if the initial state 302 is operating and the input gesture 304 is the applied gesture 108 and the applied gesture 108 matches the stored gesture 306, access 308 may be granted and the action 310 may result in the mobile device 102 being able to access data and resources stored on a remote compute server 402.

According to another exemplary embodiment, if the initial state 302 is locked and the input gesture 304 is the applied gesture 108 and the applied gesture 108 does not match the stored gesture 306, access 308 may be denied and the mobile device 102 may remain locked. Furthermore, if the initial state 302 is operating and the input gesture 304 is the applied gesture 108 and the applied gesture 108 does not match the stored gesture 306, access 308 may be denied and the mobile device 102 may not be able to access data and resources stored on a remote computer server 402.

According to an embodiment, a method of accessing a remote data resource stored on a remote computer server 402 on a mobile device 102 may be implemented. A user-defined gesture 114 may be stored in a remote computer server 402. An applied gesture 114 may be accepted as an input on a mobile device 102. The applied gesture 108 may be transmitted to the remote computer server 402 and compared with the user-defined gesture 114 stored in the remote computer server 402. According to an embodiment, an authorizing signal may be sent to the mobile device 102 to permit access to a data resource (e.g., an email account, an application, a file, an Internet site, etc.) resident on the remote computer server 402 or any other remote computer server.

Figure 1D:
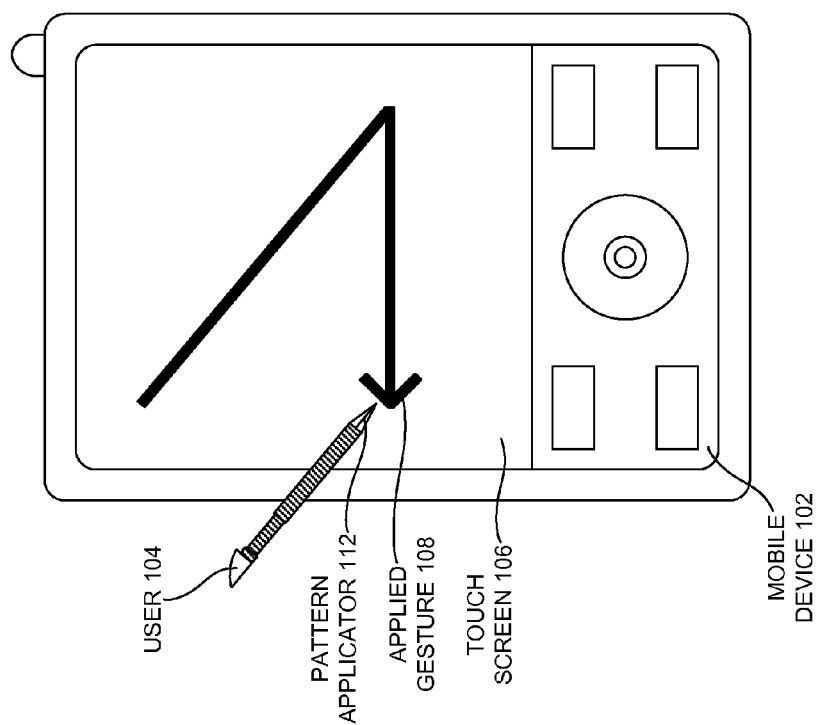
Figure 1F:
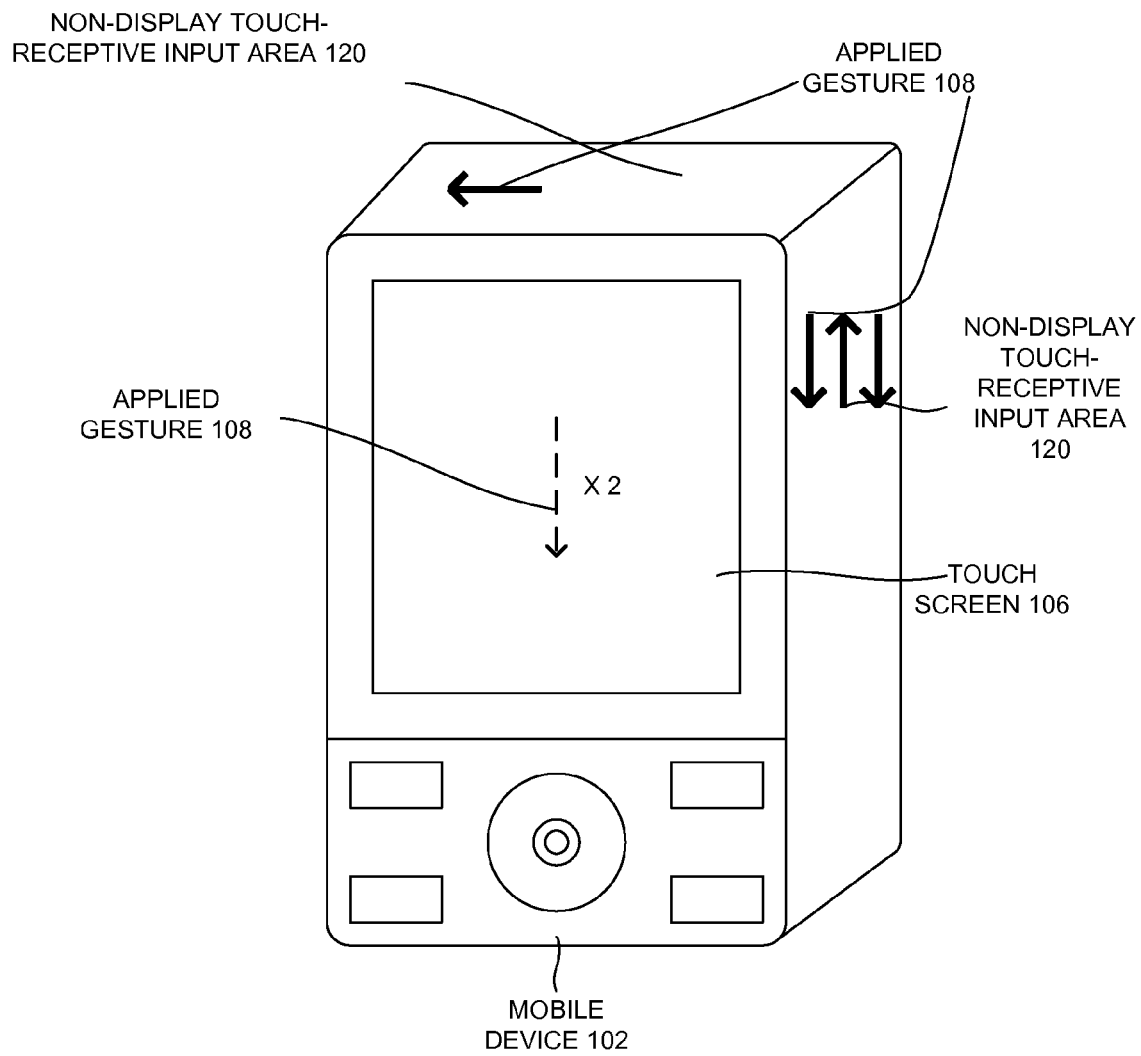
Figure 4A:
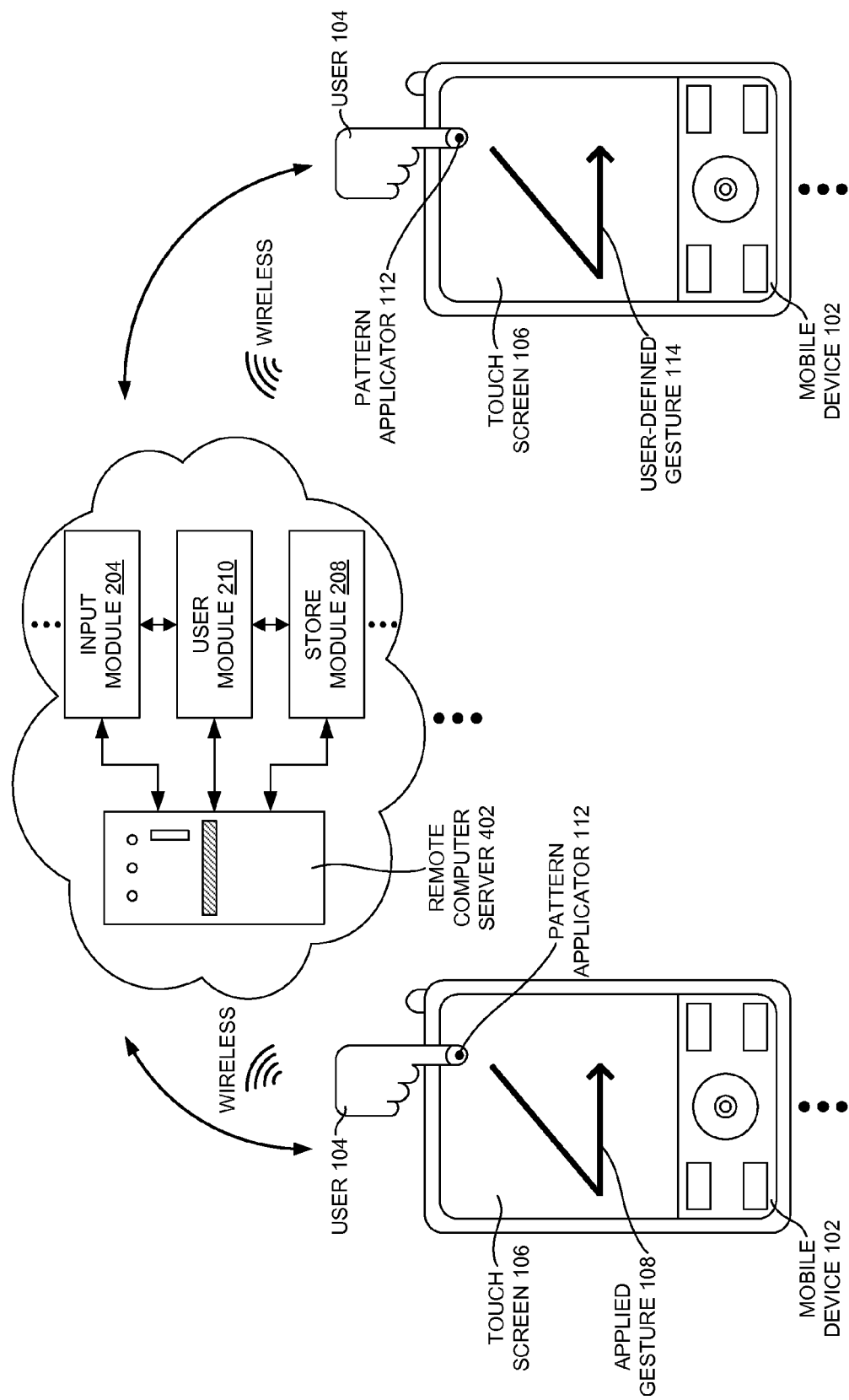
FIG. 4A is a block diagram of a security module and a store module, according to one embodiment.

FIG. 4A illustrates a system view of an exemplary embodiment of the invention. The applied gesture 108 in FIG. 4A may be entered by a user 104 on a gesture-receptive area of the mobile device 102. The touch screen 106 is configured to recognize an applied gesture 108 applied to the touch screen 106 of the mobile device 102 by a pattern applicator 112 (e.g., the user 104 of FIG. 4A, but may also include a stylus-based pattern applicator as shown in FIG. 1D). The applied gesture 108 may be wirelessly sent from the mobile device 102 to be matched against the user-defined gesture 114 which may be already stored in the remote computer server 402. The input module 204 may recognize that the applied gesture 108 may be an unlock gesture of the mobile device 102 and the user module 210 may recognize that the applied gesture 108 is a user-defined gesture 114 to be stored in the remote computer server 402 (e.g., using the store module 208 in FIG. 4A).

In another embodiment, a user-defined gesture 114 may be applied on the touch screen 106 of the mobile device 102. The user-defined gesture 114 may be wirelessly sent from the mobile device 102 to be stored in the remote computer server 402. The input module 204 may recognize that the user-defined gesture 114 may be an unlock gesture of the mobile device 102 and the user module 210 may recognize that the user-defined gesture 114 is a designated security gesture 114 once the user-defined gesture 114 is stored in the remote computer server 402 (e.g., using the store module 208 in FIG. 4A).

Figure 4B:
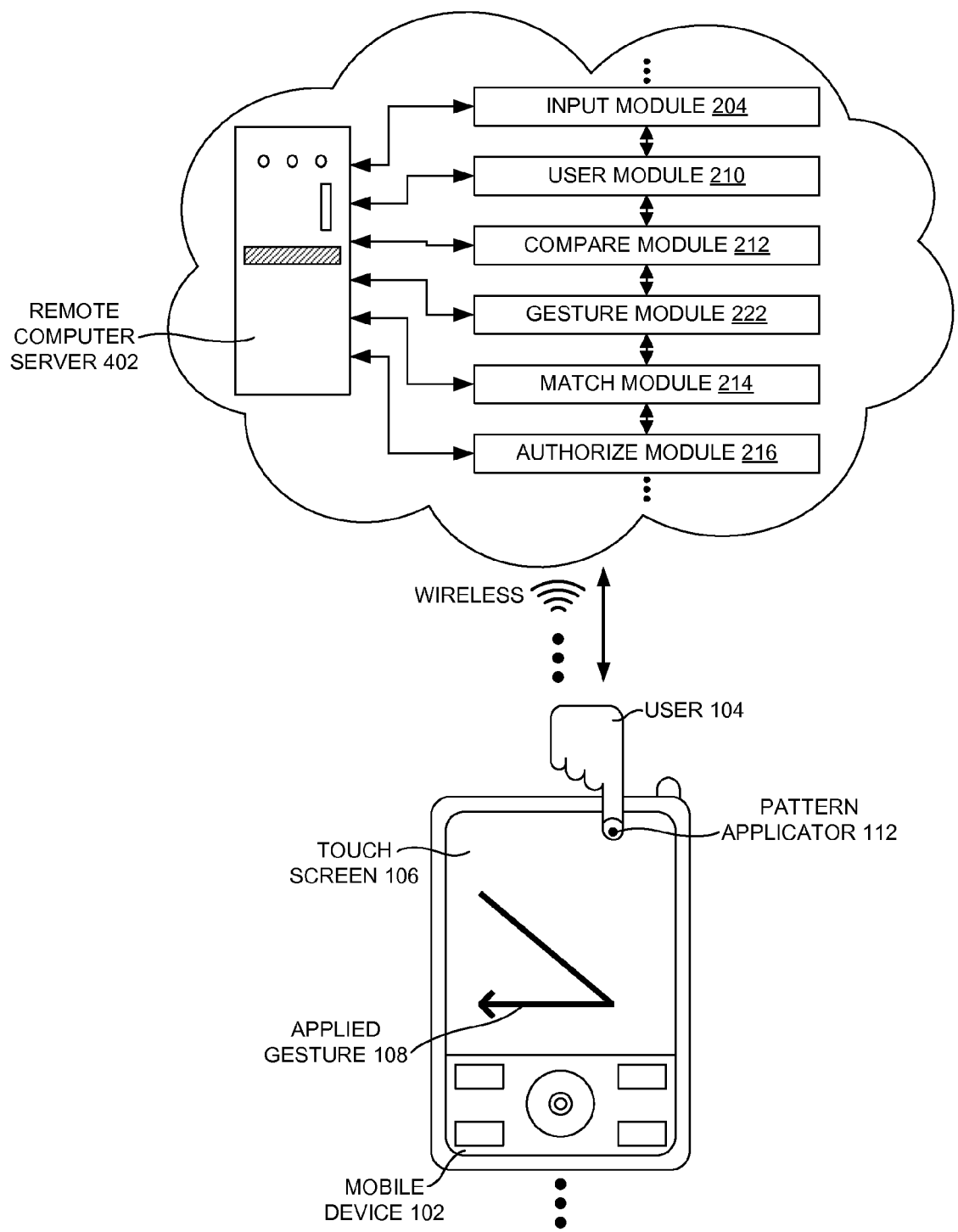
FIG. 4B is a block diagram of modules within a remote computer server, according to one embodiment.

FIG. 4B is system view of yet another embodiment of the invention. The applied gesture 108 in FIG. 4B may be entered by a user 104 on a touch screen 106 of the mobile device 102. The applied gesture 108 may then be wirelessly transmitted from the mobile device 102 to a remote computer server 402. The remote computer server 402 may contain an input module 204 to recognize the applied gesture 108 on the touch screen 106, a user module 210 may designate the applied gesture 108 as coming from a user 104, a gesture module 222 may recognize the applied gesture 108 as the unlock gesture, a compare module may compare the applied gesture 108 and the user-defined gesture 114 stored in the remote computer server 402 as a designated security gesture.

Figure 4C:
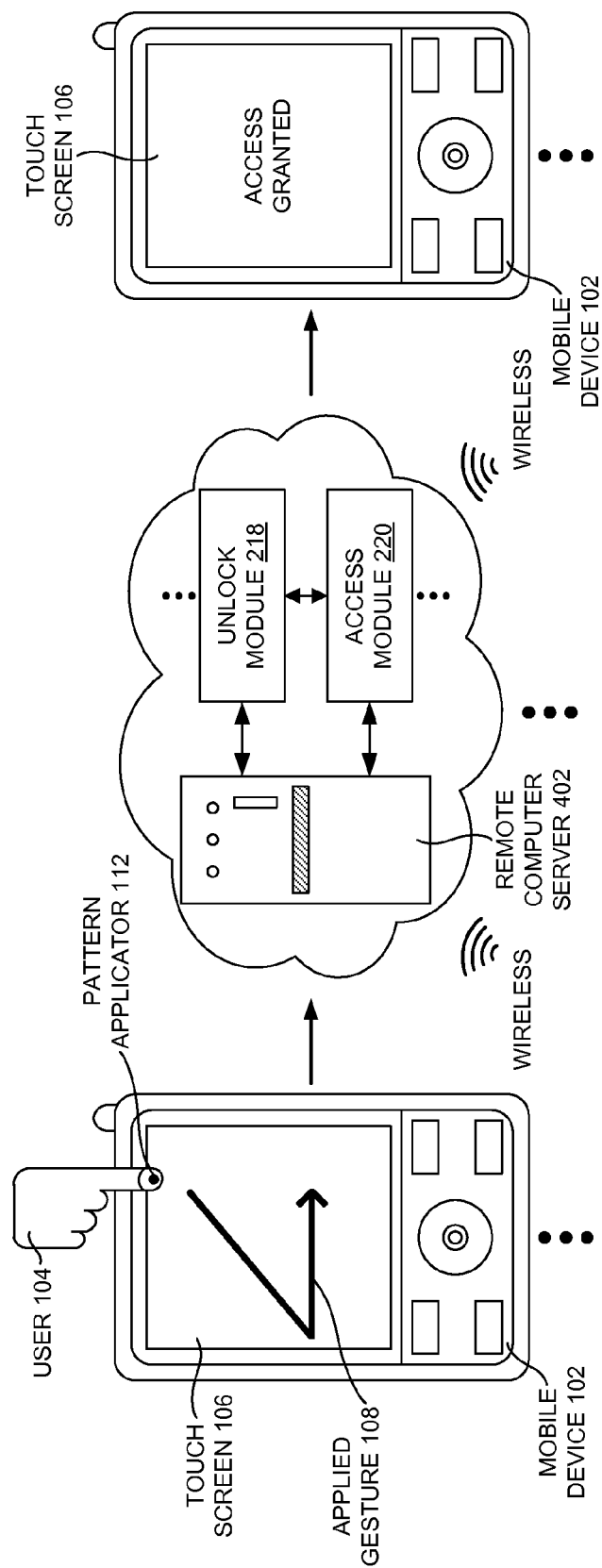
FIG. 4C is a block diagram of an unlock module and an access module that results in access to the mobile device, according to one embodiment.

FIG. 4C is a system view of an exemplary embodiment of the invention. The applied gesture 108 in FIG. 4C may be applied on a touch screen 106 of a mobile device 102 by a user 104 or a stylus-based pattern applicator as shown in FIG. 1D. The applied gesture 108 may then be transmitted to a remote computer server 402 wherein the unlock module 218 may unlock the mobile device 102 to allow access, via the mobile device 102, to a data resource stored in the remote computer server 402 (e.g., using the access module 220 in FIG. 4C) if the applied gesture 108 matches the user-defined gesture 114 stored in the remote computer server 402 as a designated security gesture.

Figure 4D:
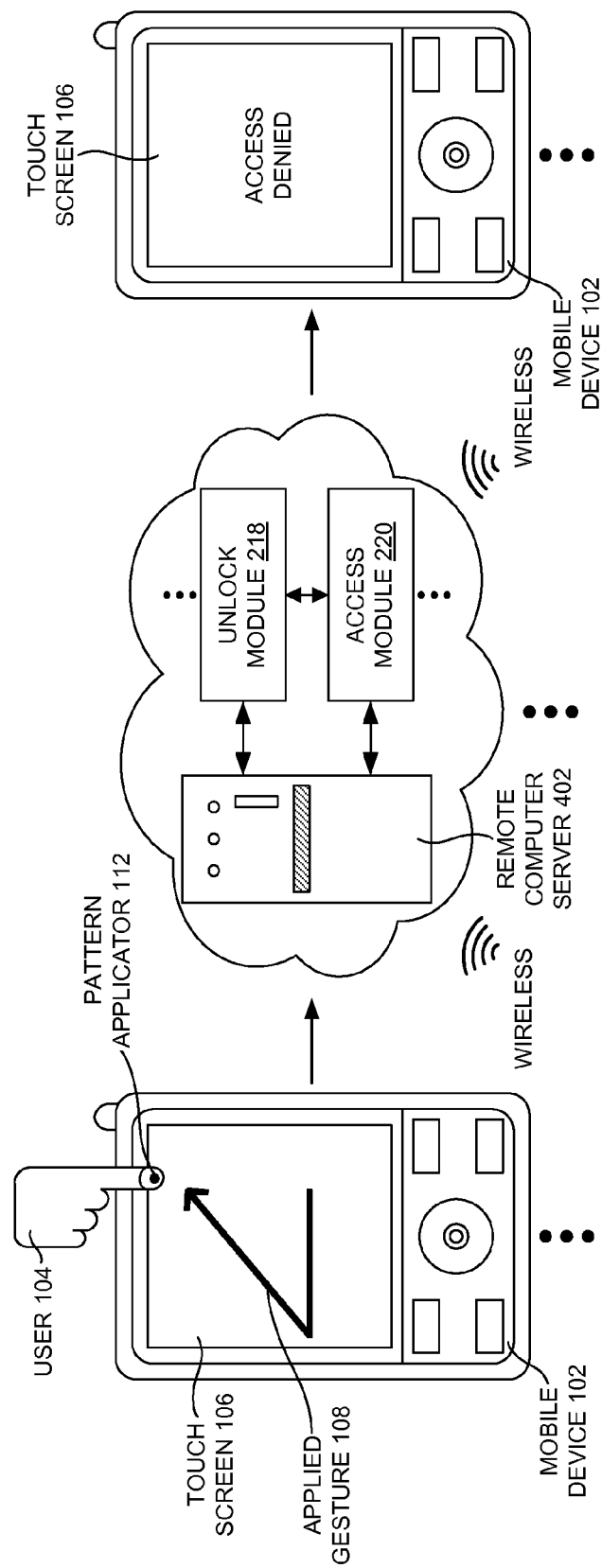
FIG. 4D is a block diagram of an unlock module and an access module that does not result in access to the mobile device, according to one embodiment.

FIG. 4D is a system view of an exemplary embodiment of the invention. The applied gesture 108 in FIG. 4D may be applied on a touch screen 106 of a mobile device 102 by a user 104 or a stylus-based pattern applicator as shown in FIG. 1D. The applied gesture 108 may then be transmitted to a remote computer server 402 wherein the unlock module 218 may not unlock the mobile device 102 and may not allow access, via the mobile device 102, to a data resource stored in the remote computer server 402 (e.g., using the access module 220 in FIG. 4C) if the applied gesture 108 does not match the user-defined gesture 114 stored in the remote computer server 402 as the designated security gesture.

Figure 5A:
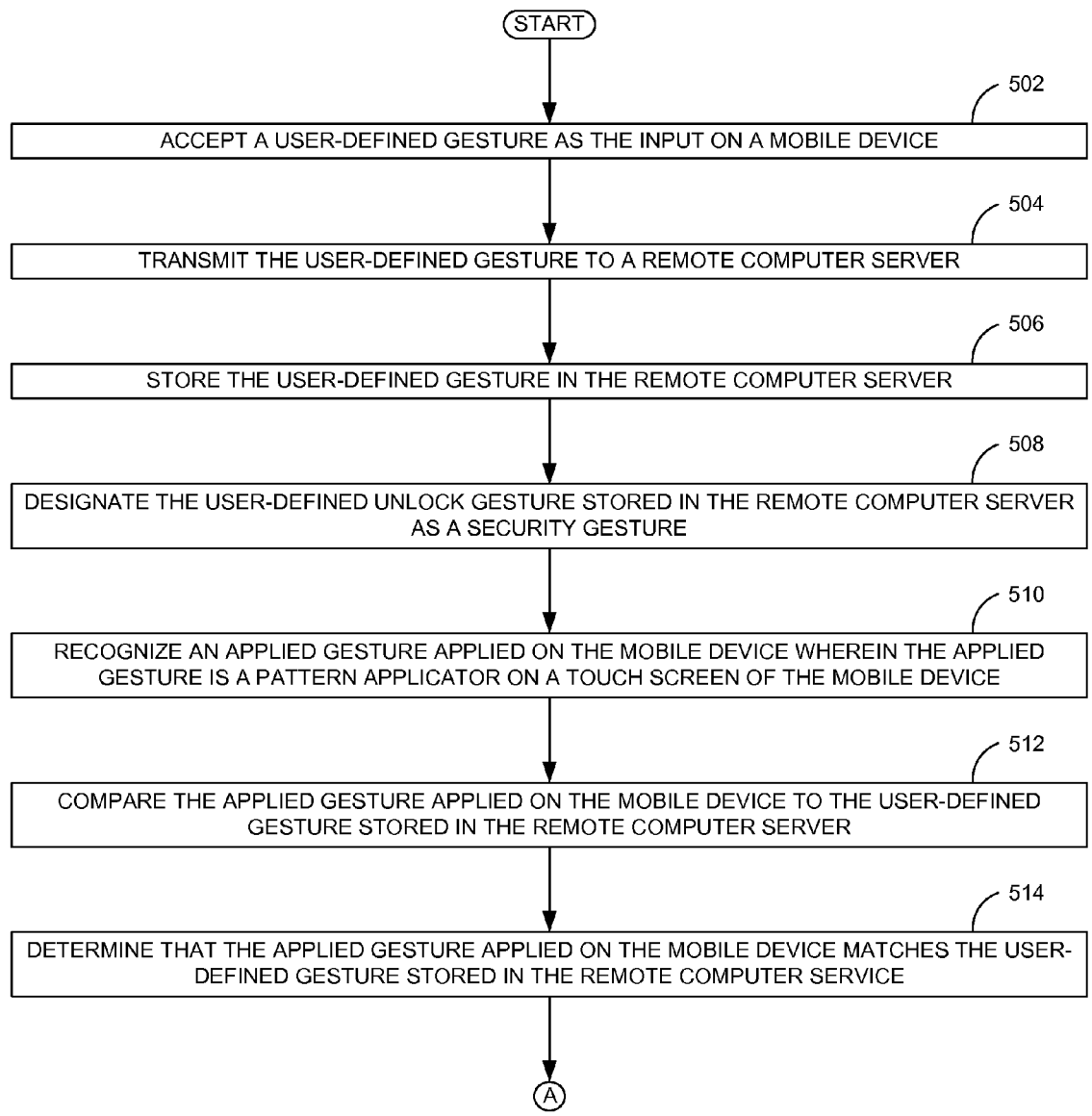
FIGS. 5A and 5B are flow charts of a process of determining that the applied gesture is associated with user-defined gesture and permitting or denying access to the mobile device or data on the remote computer server based on the association, according to one embodiment.

FIG. 5A is flow chart illustrating the steps required to determine that the applied gesture 108 applied on the mobile device 102 matches the user-defined gesture 114 stored in the remote compute server 402, according to one exemplary embodiment. A user-defined gesture 114 may be accepted as the input on a mobile device 102. The user-defined gesture 114 may be transmitted to a remote computer server 402, wherein it may be stored in the remote computer server 402. The user-defined gesture 114 may be designated in the remote computer server 402 as a designated security gesture. It may be recognized that the applied gesture 108 applied on the mobile device 102 is from a pattern applicator 112 (e.g., a user 104 or a stylus-based pattern applicator as illustrated in FIG. 1D) on the touch screen 106 of the mobile device 102.

Figure 5B:
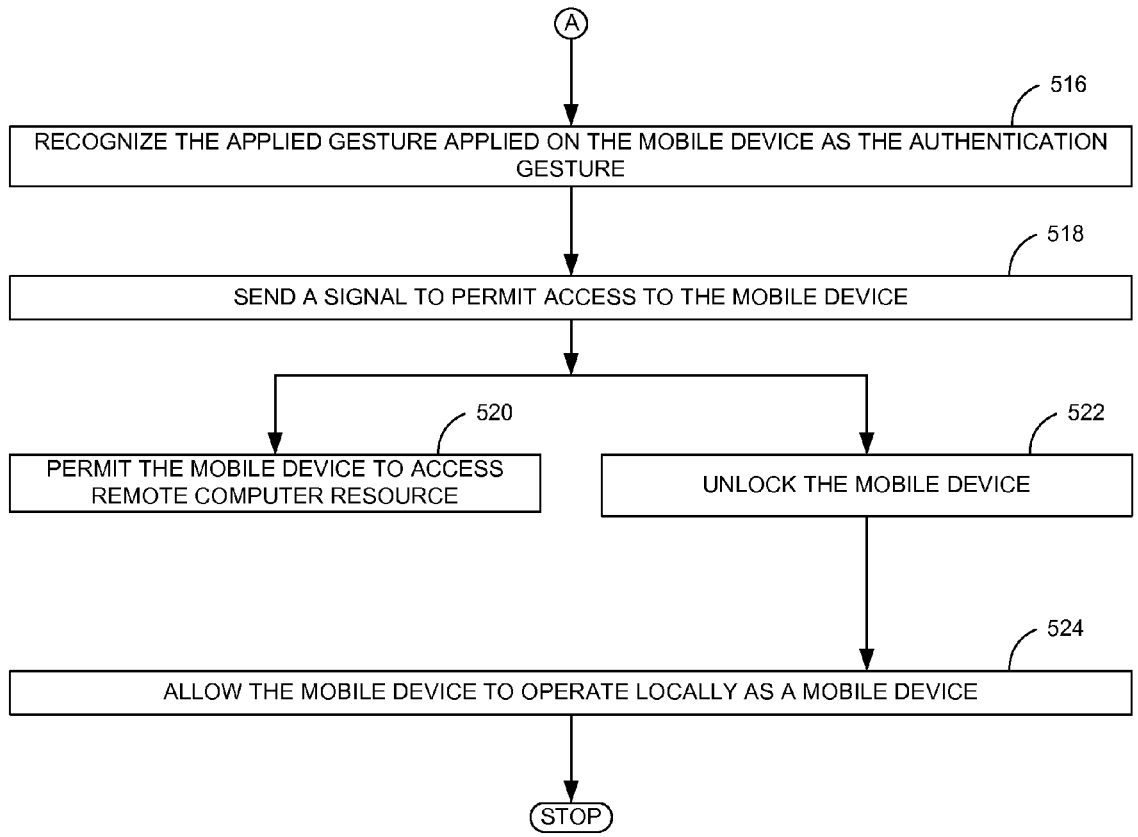

In another exemplary embodiment, authentication in a remote compute server 402 of the applied gesture 108 performed on a touch screen 106 of a mobile device 102 may permit the remote computer server 402 to allow the unlocking of the mobile device 102 which may allow the mobile device 102 to operate locally as a mobile device (e.g., as shown in the flow chart of FIG. 5B). It may be determined that an applied gesture 108 on a touch screen 106 of the mobile device 102 is associable with a user-defined gesture 114 stored in the remote computer server as the designated security gesture. A signal may be sent from the remote computer server 402 to the mobile device 102 to permit access to the mobile device 102. The mobile device 102 may then be allowed access to a remote computer resource stored in the remote computer server 402.

Figure 6:
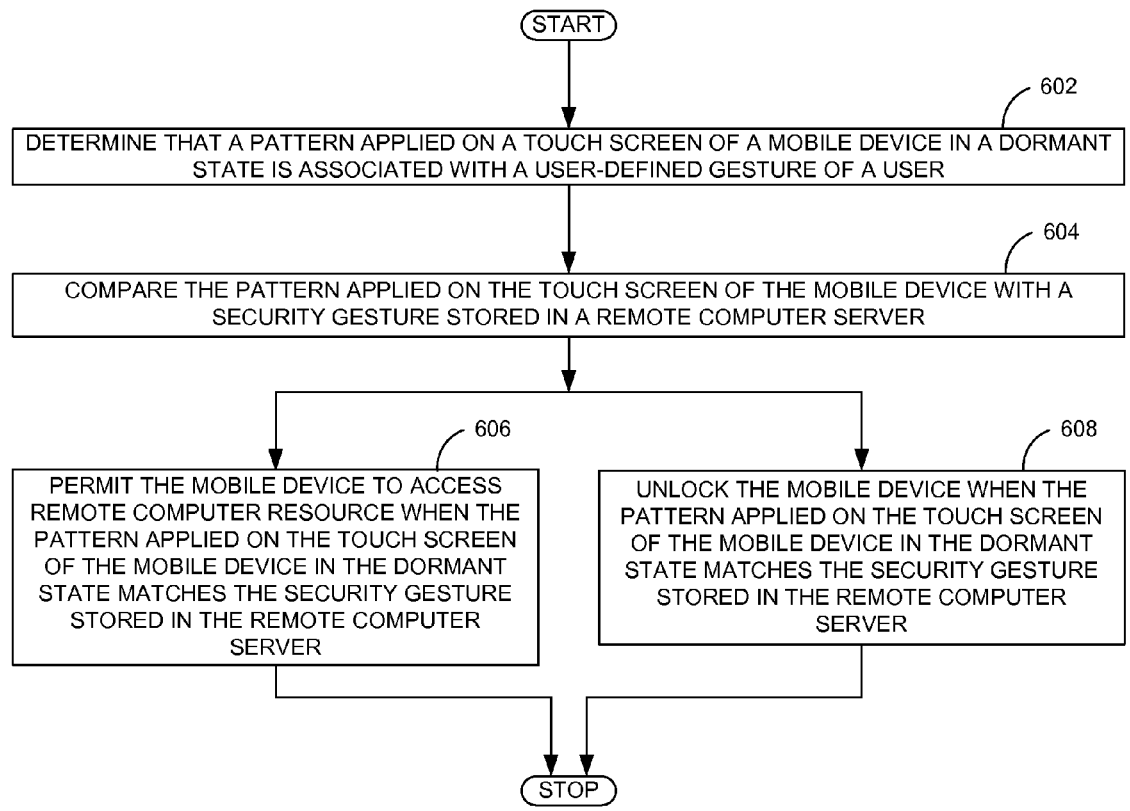
FIG. 6 is a flow chart of a process to unlock the mobile device when the applied gesture is compared to and matched with the user-defined gesture, according to one embodiment.

FIG. 6 is a flow chart illustrating the steps that may be performed to unlock a mobile device 102 when an applied gesture 108, applied using the pattern applicator 112, on the touch screen 106 of the mobile device 102 matches the user-defined gesture 114 stored in the remote computer server 402 as the designated security gesture. According to one embodiment, it may be determined that a pattern applicator 112 on a touch screen 106 of a mobile device 102 is associable with a user-defined gesture 114. A comparison may be made between the applied gesture 108 applied using the pattern applicator 112 with a designated security gesture stored in a remote computer server 402. If there is a match between the applied gesture 108 and the designated security gesture, one exemplary embodiment may permit the mobile device 102 to access a data resource stored in a remote computer server 402 or may permit the remote computer server 402 to unlock the mobile device 102.

Figure 7:
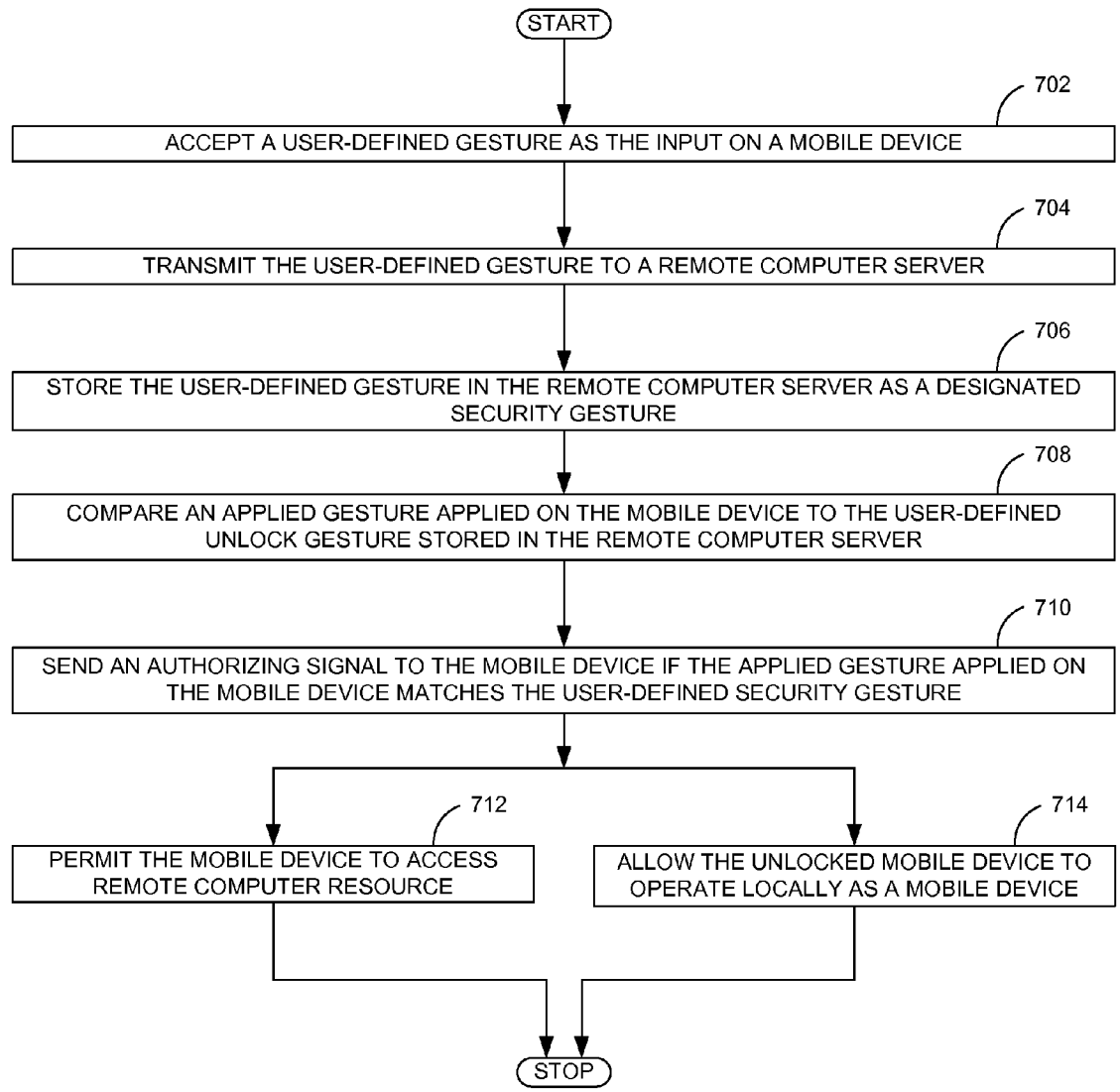
FIG. 7 is a flow chart of a process to permit a mobile device to access a remote computer resource or operate locally as a mobile device by the storing and transmitting of an applied gesture and comparison of the applied gesture to a user-defined gesture, according to one embodiment.

FIG. 7 is a flow chart that illustrates the storing of the user-defined gesture 114 in the remote computer server 402 to permit access to a data resource on the remote computer server 402 or to allow access to the mobile device 102, according to one embodiment. A user-defined gesture 114 may be accepted as the input gesture on a mobile device 102, may be transmitted to a remote computer server 402, may be designated as a user-defined gesture 114, and may be stored in the remote computer server 402. An applied gesture 108 may be applied on the mobile device 102 and may be compared to the user-defined gesture 114 stored in the remote computer server 402. Thereafter, an authorizing signal may be sent to permit access to the mobile device 102 if the applied gesture 108 applied on the mobile device 102 matches the user-defined gesture 114. The remote computer server 402 may then permit the mobile device 102 to access a remote computer resource stored in the remote computer server 402 or unlock the mobile device 102 and allow it to operate locally as a mobile device.

Figure 8:
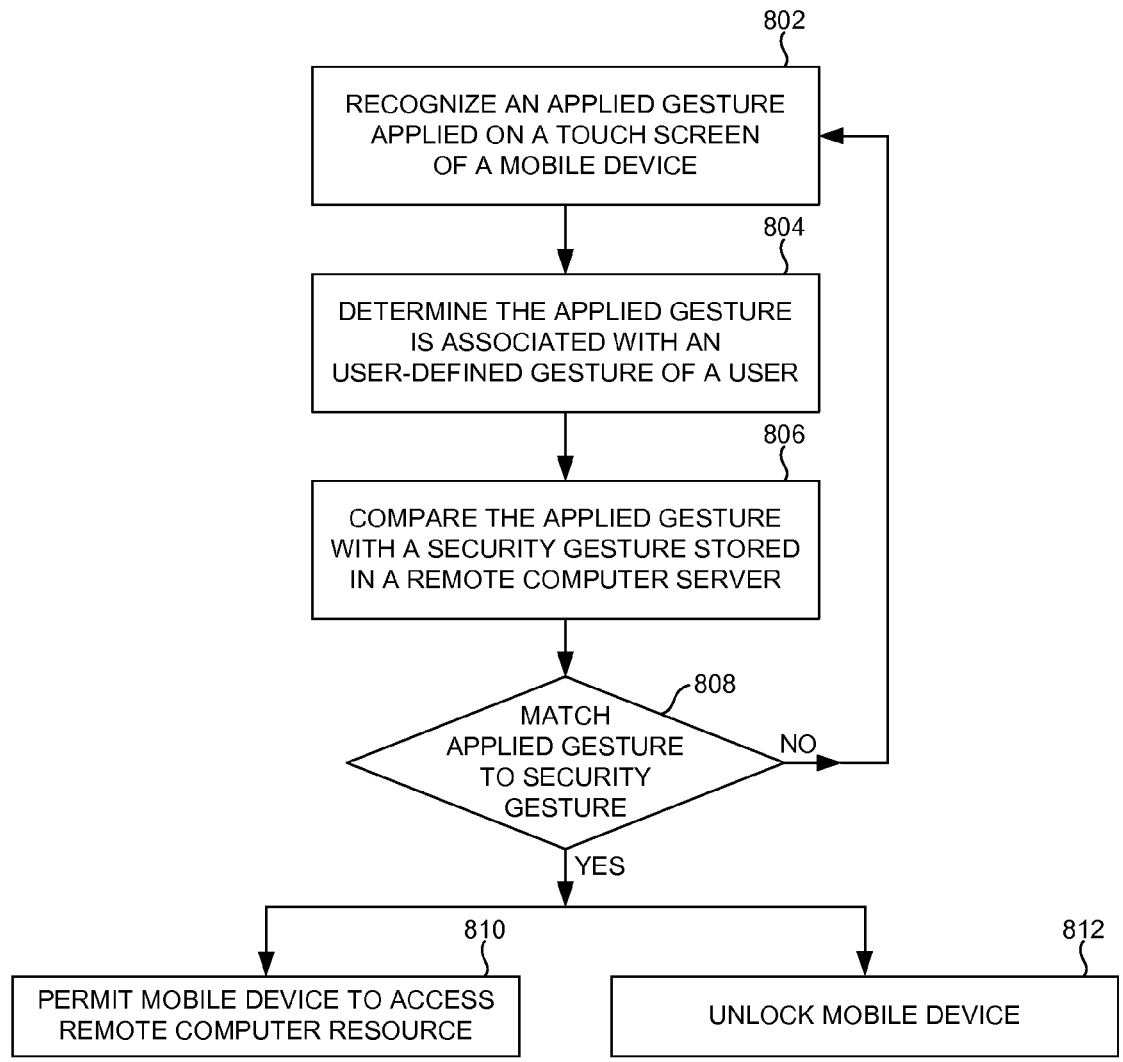
FIG. 8 is a flow chart of a process to permit a mobile device to access a remote computer resource or to unlock a mobile device, according to one embodiment.

FIG. 8 illustrates a flow chart showing the match module 214 of FIG. 2 wherein the applied gesture 108 is compared and then matched with the designated security gesture stored in a remote computer server 402. An applied gesture 108 may be recognized on a touch screen 106 of a mobile device 106. It may then be determined that the applied gesture 108 is associated with a user-defined gesture 114 of a user 104. In one embodiment, the applied gesture 108 is compared with the user-defined gesture 114 stored in a remote computer server 402 as a designated security gesture. If the applied gesture 108 matches the designated security gesture, the mobile device 102 may be permitted to access to a remote computer resource stored in a remote computer server 402 or the remote computer server 402 may unlock the mobile device 102.

Figure 9:
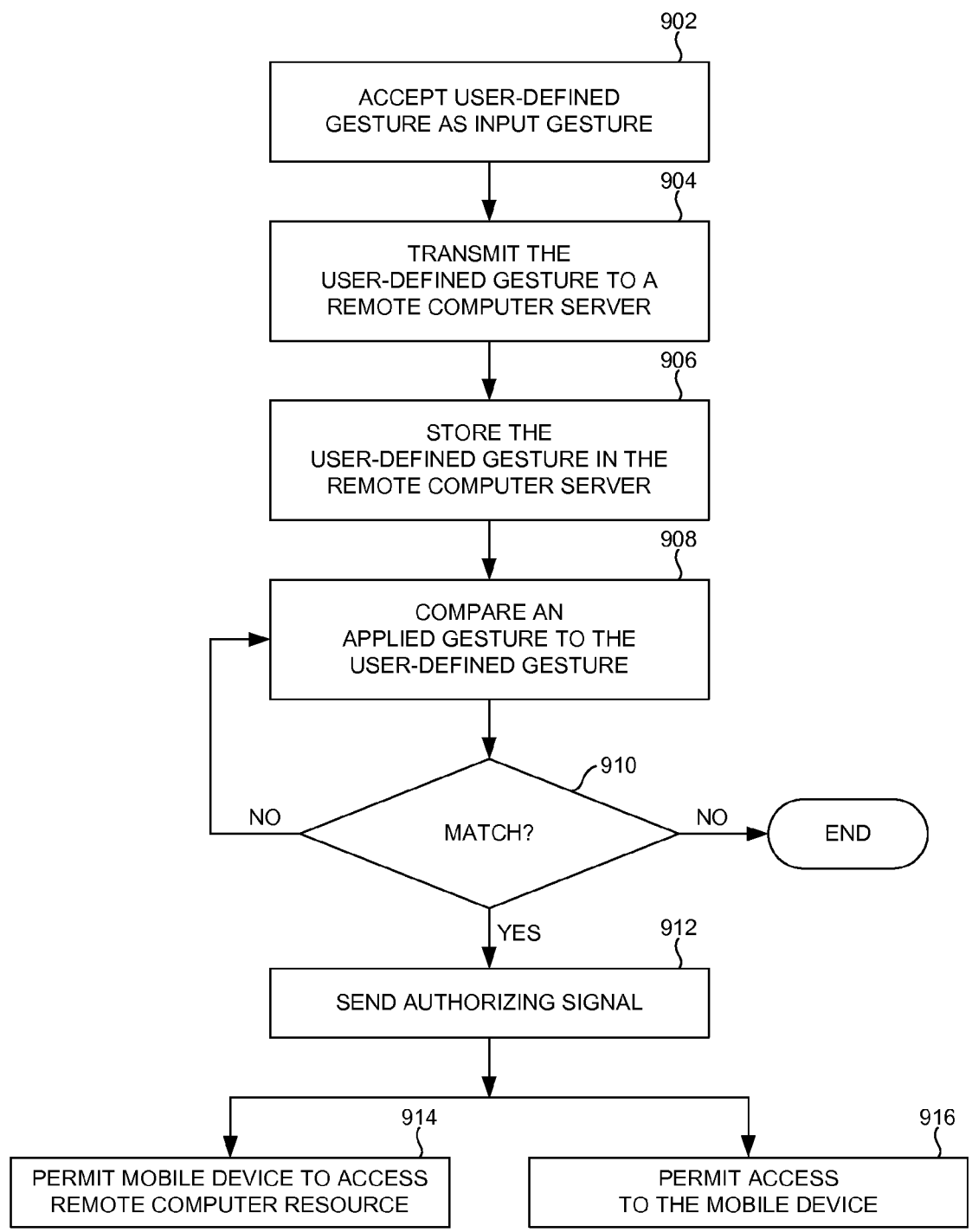
FIG. 9 is a flow chart of a process to permit a mobile device to access a remote computer resource or to permit access to the mobile device, according to one embodiment.

FIG. 9 illustrates a flow chart which details the storing of a user-defined gesture 114 in a remote computer server 402 and a matching of an applied gesture 108 to the user-defined gesture 114 stored in the remote computer server 402 as the designated security gesture. The mobile device 102 may accept a user-defined gesture 114 as an input gesture. The input gesture may then be transmitted to and stored in a remote computer server 402. A comparison may be made between the applied gesture 108 and the user-defined gesture 114. If there is a match between the applied gesture 108 and the user-defined gesture 114, the remote computer server 402 may send an authorizing signal to the mobile device 102 to either permit the mobile device 102 to access a remote computer resource stored in a remote computer server 402 or may permit access to the internal contents of the mobile device 102 to the user 104.

Figure 10A:
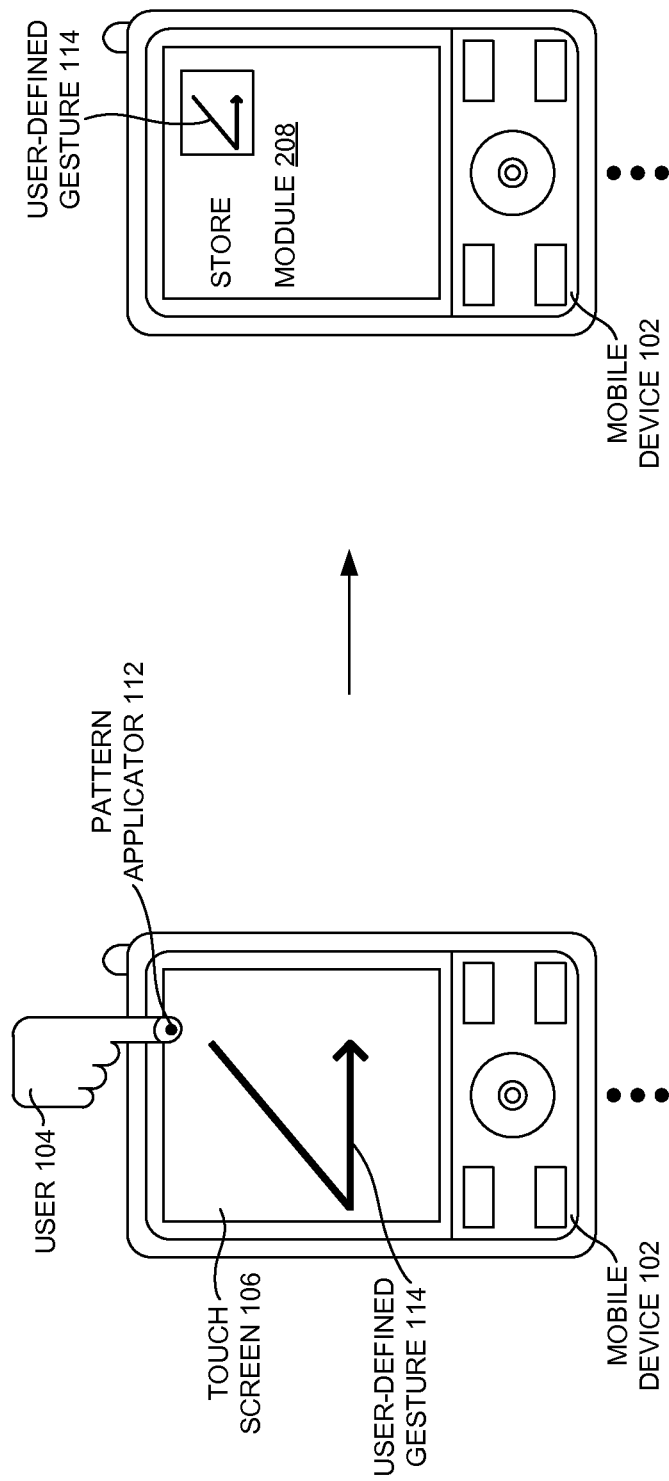
FIG. 10A is a block diagram of a mobile device and a store module resident locally on the mobile device that stores a user-defined gesture locally within the mobile device, according to one embodiment.
Figure 10B:
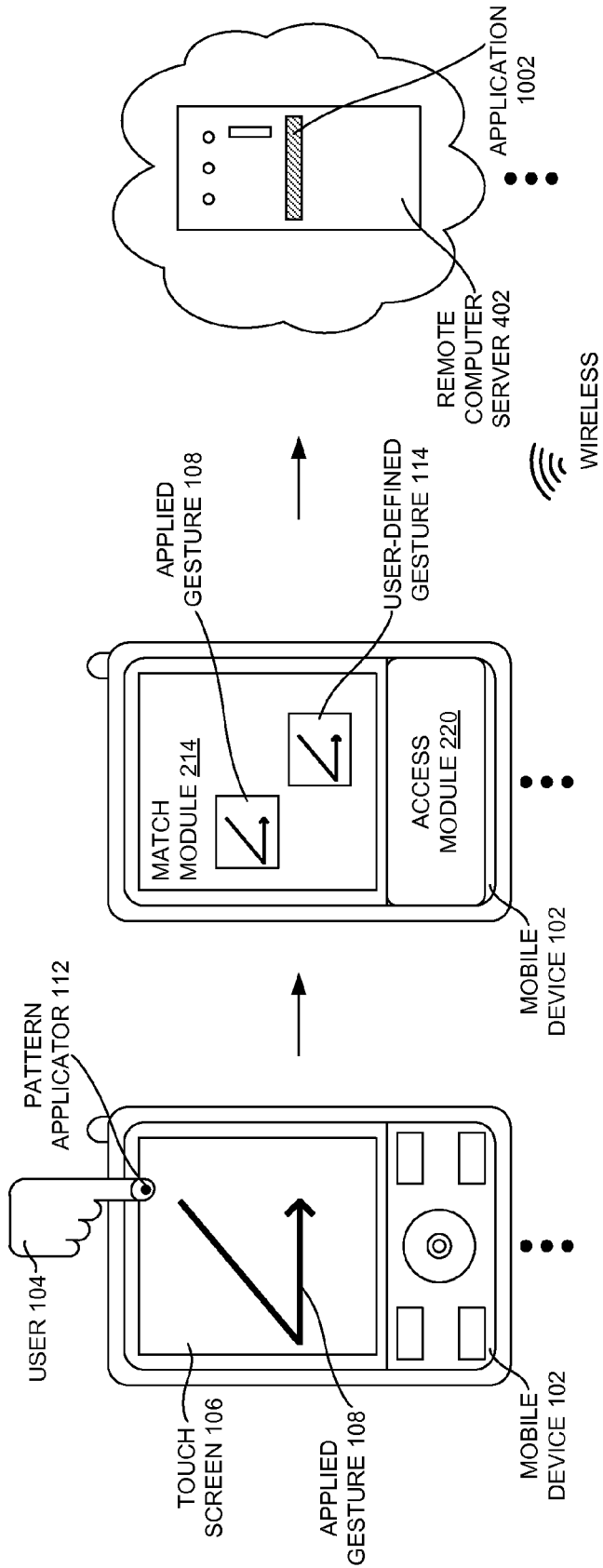
FIG. 10B is a block diagram of a mobile device that stores an applied gesture, a match module resident locally on the mobile device that matches a user-defined gesture and the applied gesture to permit access to applications resident in a remote computer server, according to one embodiment.

FIG. 10A is a system view of the store module 208 as illustrated in FIG. 2, according to one embodiment. According to another embodiment, a user-defined gesture 114 may be performed on a touch screen 106 of a mobile device 102 by a user 104. The user-defined gesture 114 may be stored internally within the mobile device 102 (e.g., using the store module 1002). In another embodiment, as illustrated by FIG. 10B, an applied gesture 108 may be compared with the user-defined gesture 114 within a match module 1004 internal to the mobile device 102. If an association is made between the applied gesture 108 and the user-defined gesture 114, access to an application 1008 resident on the remote computer server 402 via the mobile device 102 may be permitted, according to one embodiment. The application 1008 may be any software application resident on the remote computer server 402 (e.g., a finance application, a word processing application, a social-media application, a web-based application, a cloud-based application, etc.).

In another exemplary embodiment, as illustrated by FIG. 11, the applied gesture 108 may be associated with a single sign-on gesture 1108 once it has been established that the applied gesture 108 matches the user-defined gesture 114 stored in the remote computer server 402. An applied gesture 108, applied on a touch screen 106 of a mobile device 102 using a pattern applicator 112 may be wirelessly transmitted to a remote computer server 402. The store module 208 of FIG. 2 may store the user-defined gesture 114 in the remote computer server 402 for the purpose of matching the user-defined gesture 114 to the applied gesture 108 (e.g., using the match module 214 of FIG. 2). The access module 220 as shown in FIG. 2 may provide access to a plurality of resources found in a public web 1102 (e.g., Internet sites 1104, social networking website 1106, etc.) directly through the mobile device 102 with the single sign-on gesture 1108 so long as the single sign-on gesture 1108 is an applied gesture 108 and matches the user-defined gesture 114 stored in the remote computer server 402 as the designated security gesture.

Figure 12:
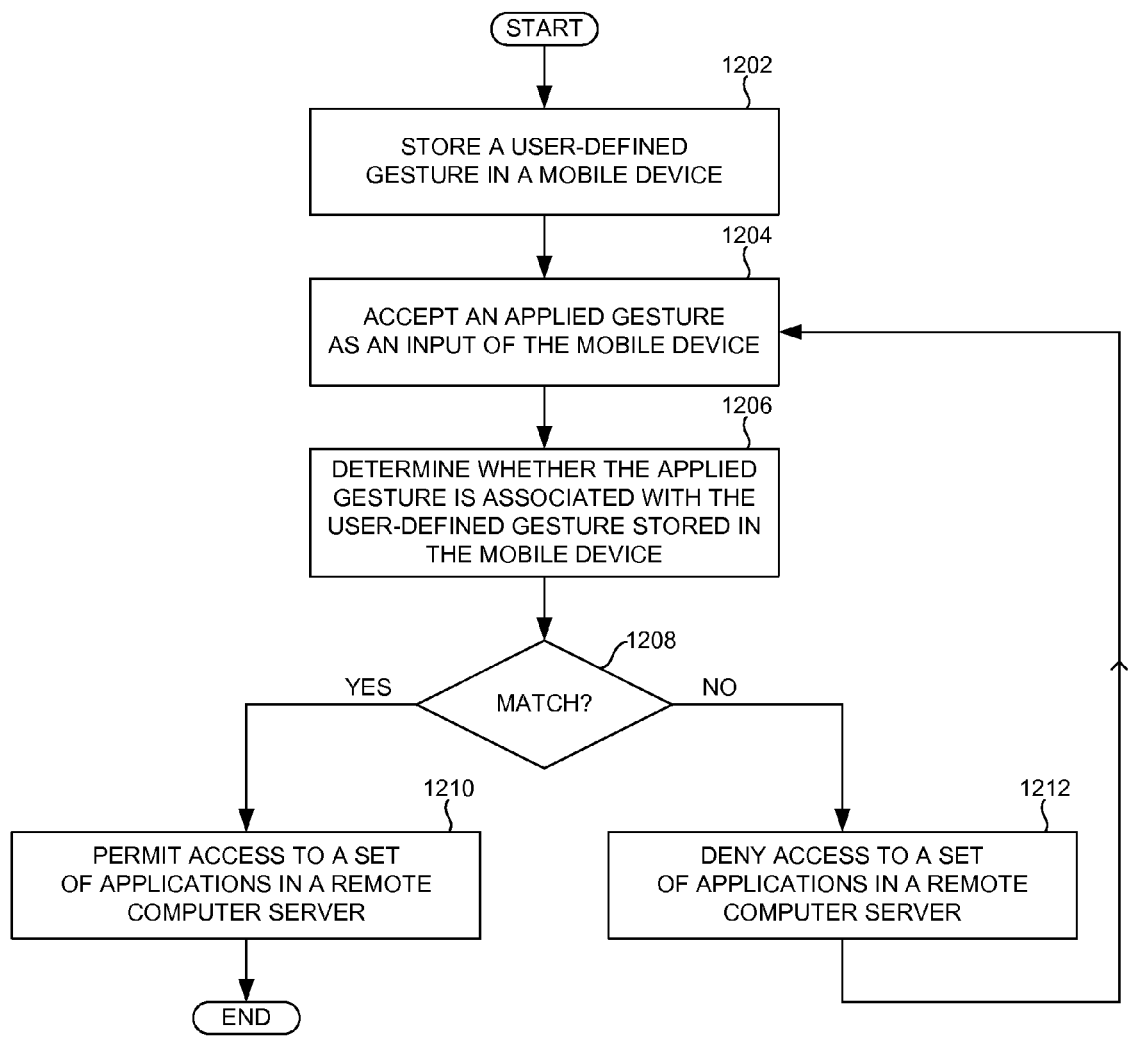
FIG. 12 is a flow chart illustrating a user-defined gesture that is stored locally on a mobile device and provides access to resources on a remote computer server, according to one embodiment.

In another exemplary embodiment, the user-defined gesture 114 may be stored locally inside the mobile device (e.g., on a memory resident within the mobile device 102) as illustrated by the flow chart of FIG. 12. An applied gesture 108 may be accepted as an input of the mobile device 102. It may then be determined whether the applied gesture 108 is associated with the user-defined gesture 114, wherein the user-defined gesture 114 is stored internally within the mobile device 102. A comparison and a match may be performed between the applied gesture 108 and the user-defined gesture 114. If the applied gesture 108 matches the user-defined gesture 114, the user 104 may be allowed access to a set of applications stored in a remote computer server 402 (e.g., a finance application, a word processing application, a social-media application, a web-based application, a cloud-based application, etc.). If the applied gesture 108 does not match the user-defined gesture 114, the user 104 may be denied access to a set of applications stored in a remote computer server 402 (e.g., a finance application, a word processing application, a social-media application, a web-based application, a cloud-based application, etc.).

Figure 13:
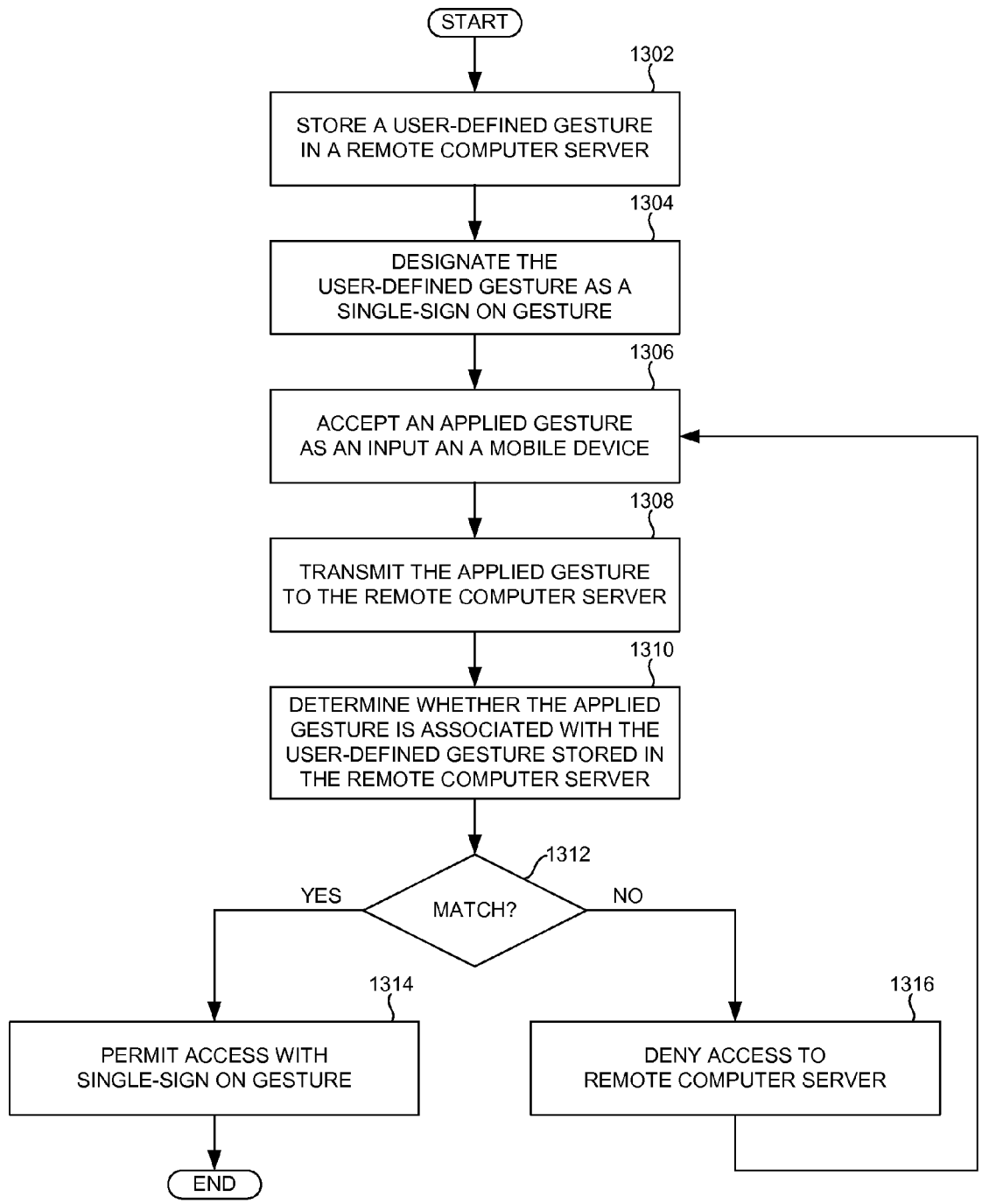
FIG. 13 is a flow chart illustrating a single sign-on gesture that provides access on the mobile device, via a remote computer server, to multiple Internet sites and social networking websites, according to one embodiment.

FIG. 13 is a flow chart illustrating an exemplary embodiment wherein a single sign-on gesture 1108 is designated as the designated security gesture if the applied gesture 108 on a touch screens 106 of a mobile device 102 matches the user-defined gesture 114 stored in a remote computer server 402. According to one embodiment, a user-defined gesture 114 may be stored in a remote computer 402. The user-defined gesture 114 may then be designated as a single sign-on gesture 1108. A mobile device 102 may be configured to accept an applied gesture 108 as an input and may transmit the applied gesture 108 to the remote computer server 402 for comparison with the stored single sign-on gesture 1108. If it is determined that the applied gesture 108 is associated with the user-defined gesture 114 stored in the remote computer server 402, access is permitted with the single sign-on gesture 1108 to a plurality of resources found in a public web 1102 (e.g., Internet sites 1104, social networking website 1106, etc.). If there is no match between the applied gesture 108 and the user-defined gesture 114, access is denied to the resource found in the public web 1102 (e.g., Internet sites 1104, social networking website 1106, etc.).

An unlocked state field may be a state in the mobile device 102 that may enable the user 104 to use applications that may be customized by the user itself. A media player may be an application that may enable the user to play the media data (e.g., video, audio, etc.) in the mobile device 102. An initial state may be the state that the mobile device would be before unlocking (e.g., power saving mode, etc.). The emergency calls only state may be a state in which the mobile device 102 may only make emergency calls. The battery conservation mode may be the state in which the mobile device 102 may not be used by the user and power consumption in the mobile device 102 may be reduced by internal logic (e.g., by shutting down light, display, etc.).

An applied gesture 108 may be allowed. The mobile device 102 from initial state to an unlocked state based on the association between the another tactile pattern (e.g., the applied gesture 108) and the unlocking gesture (e.g., the user-defined gesture 114 stored in the remote computer server 402 as the designated security gesture) may be transformed. The tactile pattern (e.g., the applied gesture 108) may be recognized as an unlocking gesture (e.g., the single sign-on gesture 1108, the user-defined gesture 114, the designated security gesture, etc.). In one embodiment, it may be determined that the applied gesture 108 may be similar to the user-defined gesture 114 beyond a tolerable value. A request for a different gesture to be stored may be made when the unlocking gesture may be beyond the tolerance value.

In one embodiment, a tactile pattern, which may be an applied gesture 108, may be recognized on the touch screen (e.g., the touch screen 106 of FIG. 1A) with or as an unlocking gesture (e.g., a user-defined gesture 114 of FIG. 1B). The unlocking gesture may be stored (e.g., using the store module 1002 of FIG. 10A) to a memory of the mobile device 102. Another tactile pattern on the touch screen 106 (e.g., the applied gesture 108) may be associated with the unlocking gesture. The mobile device 102 may be transformed from an initial state to an unlocked state based on the association between the another tactile pattern and the unlocking gesture, according to one embodiment.

In one embodiment, a tactile pattern may be determined (e.g., the applied gesture 108) on the touch screen 106 may be associated with a designated security gesture. The access may be permitted to a set of applications of the mobile device 102 when an association may be made between the applied gesture 108 and the designated security gesture, which may be stored in a remote computer server 402. The access may be denied to the set of applications of the mobile device 102 when the association fails to be made between the applied gesture 108 and the designated security gesture, which may be stored in a remote computer server 402.

In another embodiment, there may be various rules/references that may enable the user 104 to unlock the mobile device 102 through the use of tactile patterns or security gestures applied on the touch screen 106 or touch-receptive non-display input regions 120 of the mobile device 102. The input gesture 304 may be the gestures that may be accepted after determining the match between another tactile pattern and unlocking gesture may be under matching conditions (e.g., may be approximately). The rejected gestures may be the gestures that may be rejected after determining the match between another tactile pattern and the unlocking gesture may not be within the matching conditions.

In an example embodiment, an applied gesture 108 may comprise a tactile pattern consisting of application by a pattern applicator 112 within a designated touch-sensitive input region of an arbitrary complex spatial or temporal pattern of tactile forces. The tactile pattern of the applied gesture 108 may consist of one or more simultaneous or sequential point or vector tactile forces. A vector tactile force may consist of directional linear or complex curvilinear components. The gesture may include a temporal element. For example, the applied gesture 108 may include linear applications of force by the object across the touch screen 106, taps against the touch screen 106, static applications of the object in contact with the touch screen 106 for a specified period of time, or any combination thereof. The applied gesture 108 may be composed by the authorized user of the mobile device 102.

The applied gesture 108 may be applied with or without the aid of a visual template. A designated input region may represent a fixed or variable subset of the touch screen 106 or may coincide with the entire touch screen 106. The applied gesture 108 applied or path traced by one's finger or force applicator may or may not be visually indicated on the screen, and successful or unsuccessful application of the gesture may or may not be acknowledged by specific visual, audible, or haptic feedback.

According to one embodiment, the applied gesture 108 may be applied dependent or independent of its relative scale or position within the designated input region of the touch screen 106. The length and width of a two-dimensional spatial pattern performed on the surface of the touch screen 108 may or may not vary in magnitude between different applications by a user or different users. The location of the touch screen 106 on which the two-dimensional spatial pattern is performed by the user may or may not vary. Nevertheless, the two-dimensional spatial pattern may unlock the mobile device 102 or permit access to a remote computer resource 402 if the ratio of the dimensions of the length and width of the two-dimensional spatial pattern are substantially similar to the ratio of the length and width of the tactile pattern of the applied gesture 108.

According to one example, the designated security gesture may consist of a "forward double-L," applied by simultaneously moving two adjacent fingers vertically down on a touch screen 108 a distance x and then contiguously moving both fingers ninety degrees to right a distance of 0.5×. The applied gesture 108 may or may not be scale and position independent with respect to the designated input region or the touch screen 106. The size of the applied gesture 108 may be small, medium, or large relative to the size of the designated input region. The applied gesture 108 may be applied anywhere (for example, in the top left quadrant or anywhere on the right side) on the mobile device 102.

According to another example, the user may compose the applied gesture 108 consisting of the approximately simultaneous application on a touch screen 106 of three equally-spaced point contacts arrayed linearly in a horizontal orientation. These three point touches may be applied near the top or anywhere else within the designated input region and may be relatively small or large compared to the size of the designated input region of the mobile device 102.

According to another example, the applied gesture 108 may be applied with a force applicator (e.g., a stylus) on the touch screen 106 followed by holding the object in contact with the touch screen 106. According to one embodiment, an unlock gesture may be applied at any location within a designated touch-sensitive input region of a mobile device 102. The designated input region may be a touch screen 106 or some other touch-sensitive non-display input region 120 of the mobile device 102, such as its back, an edge, or a touch pad. The scale of the applied gesture 108 may be of any size relative to the designated input region of the touch screen 106 or touch-sensitive non-display input region 120 of the mobile device 102, according to one embodiment.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the security module 110, the input module 204, the communications module 206, the store module 208, the gesture module 222, the user module 210, the compare module 212, the match module 214, the authorize module 216, the remote computer server module 202, the unlock module 218, the access module 220, and all other modules of FIGS. 1-14 may be enabled using software and/or using transistors, logic gates, and electrical circuits (e.g., application specific integrated ASIC circuitry) such as a security circuit, a recognition circuit, a tactile pattern circuit, an association circuit, a store circuit, a transform circuit, an initial state circuit, an unlock circuit, a deny circuit, a determination circuit, a permit circuit, a user circuit, a region circuit, and other circuits.

Figure 14:
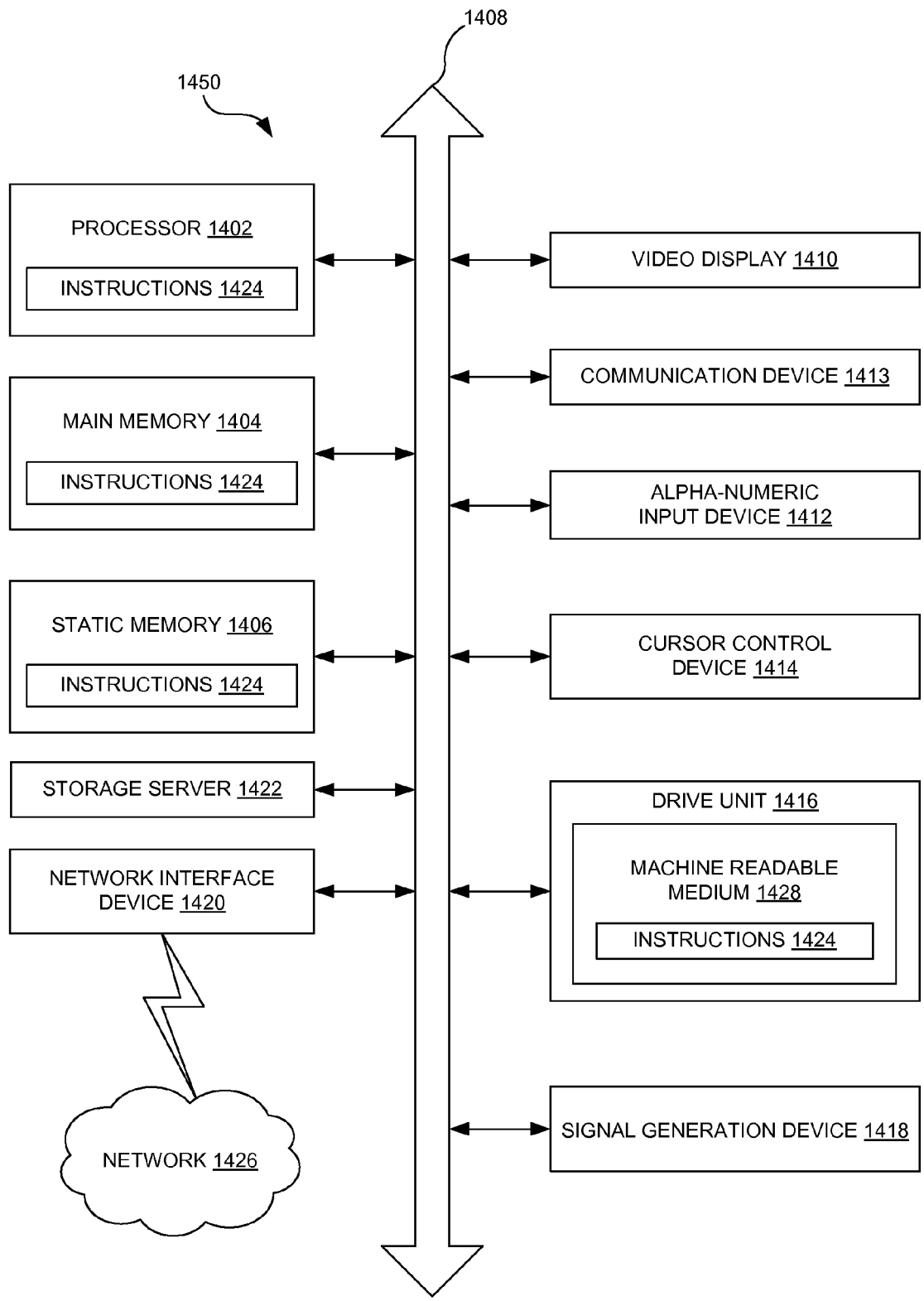
FIG. 14 is a diagrammatic view of a data processing system in which any of the embodiments disclosed herein may be performed, according to one embodiment.

FIG. 14 may indicate a personal computer and/or the data processing system in which one or more operations disclosed herein may be performed. The security module 110 may provide security to the device from unauthorized access (e.g., may be mishandled, misused, stolen, etc.). The processor 1402 may be a microprocessor, a state machine, an application specific integrated circuit, a field programmable gate array, etc. (e.g., Intel® Pentium® processor, 620 MHz ARM 1176, etc.). The main memory 1404 may be a dynamic random access memory and/or a primary memory of a computer system.

The static memory 1406 may be a hard drive, a flash drive, and/or other memory information associated with the data processing system. The bus 1408 may be an interconnection between various circuits and/or structures of the data processing system. The video display 1410 may provide graphical representation of information on the data processing system. The alpha-numeric input device 1412 may be a keypad, a keyboard, a virtual keypad of a touch screen and/or any other input device of text (e.g., a special device to aid the physically handicapped).

The cursor control device 1414 may be a pointing device such as a mouse. The drive unit 1416 may be the hard drive, a storage system, and/or other longer term storage subsystem. The signal generation device 1418 may be a bios and/or a functional operating system of the data processing system. The network interface device 1420 may be a device that performs interface functions such as code conversion, protocol conversion and/or buffering required for communication to and from the network 1426. The machine readable medium 1428 may provide instructions on which any of the methods disclosed herein may be performed. The instructions 1424 may provide source code and/or data code to the processor 1402 to enable any one or more operations disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising: accepting an applied gesture on a touch screen of a mobile device in a locked state, wherein the applied gesture does not depend on touching predetermined contact areas on the touch screen in a given order; comparing the applied gesture with a designated security gesture stored in a remote computer server, wherein the remote computer server is communicatively coupled to the mobile device through a network; and unlocking the mobile device when the applied gesture matches the designated security gesture stored in the remote computer server.

2. The method of claim 1 further comprising: unlocking another mobile device in the locked state when an another applied gesture on a touch screen of the another mobile device matches the designated security gesture stored in the remote computer server.

3. The method of claim 1 further comprising enabling a user to define the designated security gesture.

4. The method of claim 1 wherein the unlocking comprises: sending a signal from the remote computer server to the mobile device enabling a user to access the mobile device.

5. The method of claim 1 further comprising: disabling one or more mobile devices associated with the designated security gesture.

6. The method of claim 1 wherein the applied gesture is applied without the use of a visual template.

7. A method comprising: accepting a user-defined gesture as an input on a mobile device; transmitting the user-defined gesture to a remote computer server, wherein the remote computer server is communicatively coupled to the mobile device through a network; storing the user-defined gesture in the remote computer server; comparing an applied gesture on a touch-receptive area of the mobile device to the user-defined gesture stored in the remote computer server, wherein the applied gesture does not depend on touching predetermined contact areas on the touch screen in a given order; sending an authorizing signal to permit access to the mobile device if the applied gesture on the mobile device matches the user-defined gesture; and allowing the mobile device to operate.

8. The method of claim 7 wherein the mobile device is at least one of a mobile phone, a mobile tablet computer, a mobile media player, a mobile gaming device, and a mobile navigation device.

9. The method of claim 7 further comprising at least one of: permitting access to a remote resource, and permitting interaction with a plurality of remote computer resources.

10. The method of claim 7 further comprising permitting access to a feature of the mobile device.

11. The method of claim 10 wherein the feature of the mobile device is at least one of: a contact list, a media player application, a web browser program, an email account, a voicemail system, an e-book reader, a game player, a camera, a scanner, a mobile teleconferencing system, a GPS navigation device and an electronic payment device.

12. The method of claim 7 wherein the applied gesture and the user-defined gesture are applied without the use of a visual template.

13. The method of claim 7 wherein the touch-receptive area of the mobile device is one of: a touch screen of the mobile device, and an input area of the mobile device.

14. A method comprising: storing a user-defined gesture in a remote computer server; accepting an applied gesture as an input on a touch-receptive area of a mobile device, wherein the remote computer server is communicatively coupled to the mobile device through a network and the applied gesture does not depend on touching predetermined contact areas on the touch-receptive area in a given order; transmitting the applied gesture to the remote computer server; comparing the applied gesture to the user-defined gesture stored in the remote computer server; determining that the applied gesture matches the user-defined gesture stored in the remote computer server; sending an authorizing signal to the mobile device to permit access to a network resource; and allowing the mobile device to access the network resource.

15. The method of claim 14 wherein the applied gesture and the user-defined gesture are applied without the use of a visual template.

16. The method of claim 14 wherein the touch-receptive area of the mobile device is one of: a touch screen of the mobile device, and an input area of the mobile device.

17. A method of a mobile device comprising: storing a user-defined gesture in a mobile device; accepting an applied gesture as an input on a touch-receptive area of the mobile device, wherein the applied gesture does not depend on touching predetermined contact areas on the touch-receptive area in a given order; determining whether the applied gesture is associated with the user-defined gesture stored in the mobile device; authorizing the mobile device to permit access to a resource stored in a remote computer server; and allowing the mobile device to access the resource stored in the remote computer server.

18. The method of claim 17 wherein the applied gesture and the user-defined gesture are applied without the use of a visual template.

19. The method of claim 17 wherein the touch-receptive area of the mobile device is one of: a touch screen of the mobile device, and an input area of the mobile device.

20. A method to securely access a plurality of resources by applying a gesture, comprising the steps of: storing a user-defined gesture in a remote computer server; designating the user-defined gesture as a single sign-on gesture such that the single sign-on gesture single-handedly permits access from a mobile device to a plurality of otherwise restricted Internet sites and resources in a public web; accepting an applied gesture as an input on a touch-receptive area of the mobile device, wherein the applied gesture does not depend on touching predetermined contact areas on the touch-receptive area in a given order; transmitting the applied gesture to the remote computer server; determining whether the applied gesture is associated with the user-defined gesture stored in the remote computer server; permitting the mobile device access to the plurality of Internet sites and resources in the public web when an association is made between the user-defined gesture and the applied gesture; and denying the mobile device access to the plurality of Internet sites or resources in the public web when the association fails to be made between the user-defined gesture and the applied gesture.

21. The method of claim 20 wherein the plurality of Internet sites in the public web comprises at least one website that permits access to the mobile device without requiring entry of a username or a password on the mobile device.

22. The method of claim 20 wherein the defined gesture are applied without the use of a visual template.

23. The method of claim 20 wherein the touch-receptive area of the mobile device is one of: a touch screen of the mobile device, and an input area of the mobile device.

* * * * *